United States Patent
Gupta

(10) Patent No.: US 9,114,886 B2
(45) Date of Patent: Aug. 25, 2015

(54) METHOD AND SYSTEM FOR REDUCING THE FLAMMABILITY OF FUEL-TANKS ONBOARD AN AIRCRAFT

(71) Applicant: The Boeing Company, Seal Beach, CA (US)

(72) Inventor: Alankar Gupta, Normandy Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 113 days.

(21) Appl. No.: 14/162,308

(22) Filed: Jan. 23, 2014

(65) Prior Publication Data

US 2014/0208943 A1   Jul. 31, 2014

Related U.S. Application Data

(63) Continuation-in-part of application No. 13/431,046, filed on Mar. 27, 2012, now Pat. No. 8,808,428.

(51) Int. Cl.
*B65D 90/22* (2006.01)
*B01D 53/04* (2006.01)
*B64D 37/32* (2006.01)

(52) U.S. Cl.
CPC .......... *B64D 37/32* (2013.01); *B01D 2253/102* (2013.01); *B01D 2257/702* (2013.01); *B01D 2259/4516* (2013.01); *B01D 2259/4575* (2013.01)

(58) Field of Classification Search
CPC ............. B01D 53/04; B01D 2253/102; B01D 2257/702; B01D 2259/4516; B01D 2259/4575; B64D 37/32; B65D 90/22
USPC ................ 95/14, 15, 19, 141, 143, 146, 148; 96/112, 113, 115, 121, 146; 244/135 R, 244/129.2; 220/88.3
See application file for complete search history.

(56) References Cited

U.S. PATENT DOCUMENTS

| | | |
|---|---|---|
| 5,054,453 A | 10/1991 | Onufer |
| 5,755,854 A | 5/1998 | Nanaji |

(Continued)

OTHER PUBLICATIONS

Young, Jon W.; Tuttle, W.N.; Reduction of Hydrocarbon Emissions from Air through Pressure Swing Regeneration of Activated Carbon, AIChE Conference, 1997.

(Continued)

*Primary Examiner* — Frank Lawrence
(74) *Attorney, Agent, or Firm* — Parsons Behle & Latimer

(57) ABSTRACT

A fuel vapor removal method for an aircraft includes removing an ullage mixture from ullage of a fuel tank of an aircraft, exposing the ullage mixture to adsorption media on the aircraft to reduce its fuel-air ratio, and returning the reduced fuel-air ratio ullage mixture to the fuel tank. A fuel vapor removal system onboard an aircraft includes a fuel tank, having ullage containing an ullage mixture, a pumping device, configured to pump the ullage mixture in a closed loop from the fuel tank ullage and back, an adsorption system, interposed in the closed loop, and a controller, including a microprocessor and system memory. The adsorption system includes an adsorber having adsorption media capable of adsorbing fuel vapor from the ullage mixture, and the controller is programmed to activate the pumping device, to pump the ullage mixture from the ullage, through the adsorption system, and return a reduced fuel-air ratio ullage mixture back to the ullage.

26 Claims, 12 Drawing Sheets

(56) References Cited

U.S. PATENT DOCUMENTS

| | | | |
|---|---|---|---|
| 6,343,465 B1 | 2/2002 | Martinov | |
| 6,478,849 B1 | 11/2002 | Taylor | |
| 6,585,192 B2 * | 7/2003 | Beers | 244/135 R |
| 6,843,269 B2 | 1/2005 | Verma et al. | |
| 7,476,269 B2 | 1/2009 | Begley et al. | |
| 7,905,259 B2 | 3/2011 | Johnson et al. | |
| 7,918,358 B2 | 4/2011 | Gupta | |
| 7,955,424 B2 | 6/2011 | Gupta | |
| 8,128,739 B1 | 3/2012 | Gupta | |
| 2008/0199376 A1 * | 8/2008 | Limaye et al. | 423/213.2 |
| 2009/0166358 A1 | 7/2009 | Bose | |
| 2011/0061539 A1 * | 3/2011 | Lam et al. | 96/112 |

OTHER PUBLICATIONS

Schieferstein, Dr. rer. nat. Eva, "Optimizing Adsorption Processes;" Fraunhofer-Gesellschaft: Fraunhofer Institute for Environmental, Safety and Energy Technology—Projekt Online in the Web; URL: http://www.umsicht.fraunhofer.de/en/business-units/process.

Gupta, Alankar, PE; "Method and System for Making a Fuel-tank Inert Without an Inert Gas," SAE International, 2009.

US Patent and Trademark Office; Office Action for U.S. Appl. No. 13/431,046 dtd Dec. 6, 2013.

* cited by examiner

METHOD AND SYSTEM FOR REDUCING THE FLAMMABILITY OF FUEL-TANKS ONBOARD AN AIRCRAFT

PRIORITY CLAIM

This application is a continuation-in-part of U.S. patent application Ser. No. 13/431,046, filed Mar. 27, 2013 and now U.S. Pat. No. 8,808,428, and entitled "Fuel Vapor Removal Methods and Systems for Flammability Reduction," the disclosure of which is hereby incorporated by reference in its entirety.

FIELD OF THE DISCLOSURE

The embodiments pertain to fuel vapor removal methods and systems, such as for an aircraft.

BACKGROUND

In the context of fuel tanks, "inerting" may refer to the process of making ullage in a fuel tank non-flammable. The Federal Aviation Administration (FAA) reconsidered aircraft fuel tank safety after a series of fuel tank explosions between 1990 and 2001. The National Transport Safety Board (NTSB) added "Explosive Mixture in Fuel tanks in Transport Category Aircrafts" as the number one item in its 1997 "Most Wanted" Transportation Safety list.

Some known fuel tanks have a region containing liquid fuel and an ullage region that often contains evaporated fuel (i.e., fuel vapor). With the presence of air, the mixture may exhibit a fuel-air ratio within the ullage and ignition may occur when fuel-air ratio in the ullage lies within a certain range. The lower flammability limit is defined as a threshold below which the fuel-air ratio is too lean to ignite. Similarly, the upper flammability limit is defined as the threshold above which the fuel-air ratio is too rich to ignite. The fuel-air ratios between the lower flammability limit and the upper flammability limit are termed flammable.

At temperatures less than 100° F. at sea level, the ullage fuel-air ratio for Jet A fuel generally lies below the lower flammability limit. However, known conditions exist that may result in exceeding the lower flammability limit. One example includes a rapid reduction in tank ullage pressure after takeoff, such as when the aircraft reaches a high altitude in a short time before fuel-tank temperature substantially decreases.

FAA regulations require that new and in-service transport aircraft include systems for enhancing the safety of aircraft fuel tanks. For protection against fire/explosion in the fuel tank ullage, several previous methods have been used. One method is referred to as ullage inerting, and involves pumping an inert gas, such as nitrogen, into the ullage, to reduce the oxygen concentration therein. The nitrogen can be obtained from cryogenic storage bottles on board the aircraft, or from an Onboard Inert Gas Generator System (OBIGGS). OBIGGS is used in many commercial and cargo airplanes and some high performance military aircraft. Unfortunately, ullage inerting systems are expensive, complex, and increase the weight of the aircraft. They also add a logistics penalty.

Another method that has been used is filling the fuel tank with flexible open cell polyurethane foam. Due to its limited life and stability, several changes of the foam are required during the life of the aircraft, increasing maintenance costs. These foams also contribute to weight and volume penalties, and are prone to electrostatic problems.

Finally, Halon fire suppression systems are used in some high performance aircraft (e.g. F-16). Unfortunately, Halon has been banned from production because of its adverse impact on atmospheric ozone.

Another known system cools the ullage mixture to condense fuel vapors and to maintain the fuel tank ullage at a relatively low fuel-air ratio, significantly lower than the flammability limit.

All the above methods suffer from various drawbacks, such as weight, volume and cost penalties. The present disclosure is directed toward addressing at least one of these issues.

SUMMARY

In an embodiment, a fuel vapor removal method for an aircraft includes removing an ullage mixture, having a fuel-air ratio, from ullage of a fuel tank of an aircraft, exposing the ullage mixture to adsorption media of an adsorber on the aircraft, to produce a reduced fuel-air ratio ullage mixture, and returning the reduced fuel-air ratio ullage mixture to the fuel tank.

In another embodiment, a fuel vapor removal system onboard an aircraft includes a fuel tank, having ullage containing an ullage mixture, a pumping device, configured to pump the ullage mixture in a closed loop from the fuel tank ullage and back, an adsorption system, interposed in the closed loop, and a controller, including a microprocessor and system memory. The adsorption system includes an adsorber having adsorption media capable of adsorbing fuel vapor from the ullage mixture, and the controller is programmed to activate the pumping device, to pump the ullage mixture from the ullage, through the adsorption system, and return a reduced fuel-air ratio ullage mixture back to the ullage.

BRIEF DESCRIPTION OF THE DRAWINGS

Some embodiments are described below with reference to the following accompanying drawings.

Figure 1:
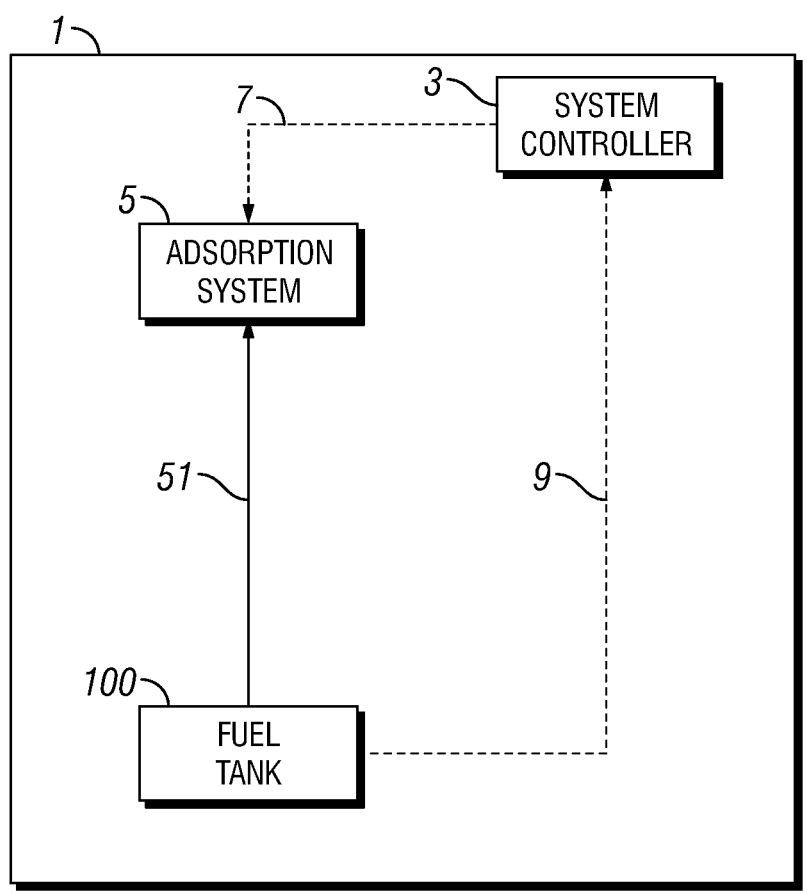
FIGS. 1 and 2 are schematics of fuel vapor removal systems according to two embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Embodiments described herein may reduce fuel vapor discharge from fuel tanks. Also, the embodiments may make fuel tank ullage non-reactive with ignition sources, i.e., make it inert or, in other words, limit formation of a flame when challenged by an ignition source.

The embodiments may reduce fuel vapor discharge from fuel tanks during fuel tank servicing (filling). Some of the fuel vapors that presently exhaust out of the fuel tank through the fuel tank vent during fuel tank filling may be adsorbed in a fuel vapor adsorption media, or adsorbent, such as activated charcoal.

The embodiments may reduce fuel tank ullage flammability by reducing ullage fuel-air ratio with a preventive system. Flammable fuel tank ullage may be rendered non-reactive with ignition sources (i.e., inert) by reducing ullage fuel-air ratio significantly below the low flammability limit (or combustion threshold.) The system may purge the fuel tank ullage with outside (ambient) air. Purged fuel vapors may be adsorbed by the adsorbent.

The embodiments may desorb (or reactivate) the adsorbent onboard. The released fuel vapors may be: (a) condensed to liquid fuel and returned to the fuel tank, or (b) ducted to the propulsive engine for combustion/destruction, or (c) exhausted overboard.

The embodiments use a process of adsorption, which may include the adherence of a chemical species onto the surface of a substance, such as particles. Adsorption differs from absorption in which a substance merely diffuses into a liquid or solid. A variety of adsorbing materials may be used in the embodiments, such as activated charcoal. Activated charcoal is known for use to adsorb fuel vapors.

The embodiments may withdraw ullage mixture using a suction pump when the fuel tank is being serviced. The withdrawn ullage mixture may be channeled through the adsorbent that adsorbs the fuel vapor and exhausts out air of low fuel vapor content. Presently, the ullage mixture is forced out of the fuel tank through the fuel-tank vent to the ambient as fuel is added to the fuel tank. Fuel vapors are malodorous and some components of the discharge are claimed to be carcinogenic. Fuel vapors are considered to be hazardous to humans and the environment. Automobiles and gas stations have fuel vapor recovery systems for this reason. Aviation uses billions of gallons of fuel annually and billions of cubic feet of ullage mixture is exhausted to the outside ambient during fuel tank servicing.

The embodiments may use ullage purging for removing fuel vapors from the ullage to reduce ullage fuel-air ratio. Proactive purging of the fuel tank may reduce occurrences when the fuel tank becomes flammable. The start of purging process can be selected at desired fuel temperature (or fuel-air ratio, as they are related at ullage saturation).

Fuel tanks tend to become flammable when the fuel temperature ($T_{fuel}$) is equal to or above the low flammability limit temperature $T_{lfl}$. In the embodiments, purging of the ullage may start at fuel temperature (referred to herein in $T_{start}$) lower than the low flammability limit temperature and may be stopped at fuel temperature (referred to herein as $T_{stop}$) below the start temperature, $T_{start}$. This ensures non-flammable ullage mixture that is non-reactive with ignition sources, i.e., inert. In the event the fuel tank temperature is already greater than $T_{lfl}$ (i.e., the fuel tank is flammable), the start of purging removes flammable ullage mixture and dilutes the ullage with ambient air, thus progressively reducing ullage flammability and rendering it inert.

The purging start temperature ($T_{start}$) and stop temperature ($T_{stop}$) may be determined using the fuel tank pressure ($P_{fuel}$) or ambient pressure ($P_{amb}$), if the fuel tank is vented. The method for determining $T_{start}$ and $T_{stop}$ may reside in the system controller. The controller may also contain the logic for starting and shutting off fuel-tank purging functions. Ullage purging may be accomplished using a suction pump that withdraws ullage mixture through the adsorbent and discharges overboard air of low fuel content. Outside air may enter the fuel tank through a fuel tank vent and/or other openings of similar function to occupy the space vacated by the withdrawn ullage mixture.

Reactivation of the adsorbent may occur when the fuel tank is inert. Fuel tanks are generally inert at high altitude when the fuel ($T_{fuel}$) temperatures are significantly lower than the low flammability limit temperatures, $T_{lfl}$. The system logic first confirms that the ullage is inert by comparing the fuel temperature ($T_{fuel}$) with the relevant purging system start temperature ($T_{start}$). On confirmation of inert status, the reactivation system operates if the outside air pressure ($P_{amb}$) is below the selected designed pressure ($P_r$). In the case of a vented fuel tank, $P_{amb}$ is equal to $P_{fuel}$ and it may be used as the determining factor.

During the reactivation process, warm air may be forced through the adsorbent to facilitate release and removal of the adsorbed fuel vapors. Ullage flammability may be periodically or continuously checked during the reactivation process. The reactivation process may be suspended and the purging process activated if $T_{fuel}$ exceeds the relevant $T_{start}$ (i.e., conditions conducive to making the ullage non-inert are encountered). The reactivation process may automatically restart when conditions for the reactivation process exist. The reactivation process may operate continuously till $P_{amb}$ or $P_{fuel}$ becomes greater than $P_r$. Desorption at high altitude (or low pressure) may use the "pressure swing desorption" principle. In pressure swing desorption, reducing the absolute pressure of the adsorbent facilitates desorption and restoration of an adsorbent's working capacity. Desorbed fuel may be swept from the adsorbent by the warm reactivation air.

Fuel vapor rich air from a desorption system may be additionally conveyed by ducting to: (a) a propulsive engine(s) for combustion/destruction, or (b) a heat-exchanger for cooling (perhaps using outside air), separating condensed fuel vapors in a fuel mist separator, returning condensed fuel to the fuel tank, and exhausting air of low hydrocarbon content over board, or (c) a discharge port for exhaust overboard during flight.

Benefits of the embodiments may include reducing discharge of fuel vapors to outside ambient during fuel tank servicing. Presently, no regulations forbid the exhaust of fuel vapors during servicing of the airplane fuel tanks. However, such regulations exist for automobiles and service stations. To the extent that it becomes advisable to reduce fuel vapor release, options (a) and (b) in the preceding paragraph may provide a cost effective method for doing so. Also, option (c) reduces localized release by dispersing fuel vapors over a wide area at high altitude.

Another benefit includes a method to inert a fuel tank without the use of an inert gas. Purging of the fuel tank is an effective method based on the fact that lean fuel-air mixtures do not ignite. The threshold fuel-air ratio for combustion of Jet A fuel is approximately 0.03 for altitudes from sea-level to 45,000 feet. This fuel-air ratio may occur in fuel vapor saturated ullage at temperatures of approximately 105° F. at sea level, reducing linearly to approximately 60° F. at 35,000 feet altitude. In the embodiments, one may select fuel temperature corresponding to saturated fuel-air ratio of approximately 0.02 to start ullage purge and provide a high safety factor. Another basis for selecting fuel temperature may be used instead. A saturated fuel-air ratio of 0.02 corresponds to $T_{start}$ of approximately 85° F. at sea-level and 45° F. at 35,000 feet. The systems and methods herein may maintain the fuel-tank ullage fuel-air ratio significantly below 0.02 even when the fuel temperatures are higher or the fuel tank is heated and prevent the fuel tank from becoming flammable. In the event the fuel tank is flammable at the start of the purging process, the system may reduce ullage flammability and render it inert.

A further benefit includes inerting a fuel tank with or without engines operating. Known nitrogen gas systems (NGS) for inerting cannot be used until high-pressure air is available. This may require operating engines to service the on-board inert gas generating system (OBIGGS). The embodiments use a small fraction of the power required by NGS. The embodiments do not generate nitrogen-enriched air (NEA), which presents an asphyxiation hazard. Also, the embodiments do not generate oxygen-enriched air (OEA), which presents a fire hazard. In addition, the embodiments do not discharge one cubic feet of hydrocarbon laden ullage mixture for each cubic feet of NEA supplied to the fuel tank. Instead, the embodiments provide extremely safe methods and systems to inert a fuel tank.

A still further benefit includes inerting a fuel tank without expensive components, such as those used by NGS, e.g., air separation module (ASM) including hollow fiber membrane (HFM), high efficiency air filter, ozone converter, turbo-compressor, oxygen sensor, etc. The embodiments might be configured with only one moving part, a blower; a simple component of high reliability that can be easily replaced, in situ, thus enhancing system availability. The complexity of maintaining NGS requires 10-20 day relief from Minimum Equipment List (MEL) requirements, or the minimum components that must be functioning for aircraft to be permitted to operate. A 10-20 day relief means aircraft can operate for 10-20 days with a failed NGS. This defeats the purpose for NGS.

Yet other benefits include reduced need for spare parts, reduced maintenance cost, low recurring and non-recurring costs, and a method that truly inerts a fuel tank. NGS designed to FAA requirements does not inert a fuel tank under all foreseeable conditions. NGS design requirements (Appendix N of 14 Code of Federal Regulations, part 25) are not based on preventing the formation of a flame when ullage is exposed to an ignition source. Instead, the design requirements are based on the development of an internal pressure (or force) necessary to rupture a foil diaphragm of 100 square inches installed on a 9.0 cubic feet test fuel tank that bears no similarity to a typical aircraft fuel tank. While it might inert a fuel tank under some circumstances, such design specification for NGS design does not ensure an inert (non-flammable) ullage during all foreseeable operating conditions.

Another known system described in U.S. Pat. No. 6,343,465 issued to Martinov involves ducting fuel fume-vapors from ullage to aircraft engines. In comparison, some embodiments herein do not require an operating engine or Auxiliary Power Unit (APU) for operation. Performance (ullage mixture removal rate) may be independent of the engine power. The embodiments may be used to reduce ullage flammability or render the ullage inert before engine start using ground electrical power.

In an embodiment, a fuel vapor removal method includes removing fuel vapor from ullage of a fuel tank of a vehicle, adsorbing the fuel vapor removed from the ullage onto adsorption media on the vehicle, and desorbing the fuel vapor from the adsorption media while on the vehicle.

By way of example, the method may further include determining that the ullage is approaching flammability before the removing of the fuel vapor from the ullage. The vehicle may include an aircraft and the desorbing of the fuel vapor may occur while the aircraft is in flight. The method may further include exhausting the desorbed fuel vapor overboard while the aircraft is in flight or burning the desorbed fuel vapor in a propulsive engine of the aircraft. Instead, the method may further include condensing the desorbed fuel vapor and returning the condensed fuel to the fuel tank.

The removing of the fuel vapor may include purging the ullage with air added into the ullage and the method may further include reducing a fuel-air ratio in the ullage using the air purging. The reduced fuel-air ratio may be below a flammability limit. The added air may be from outside the aircraft or from an onboard source. The added air may be conditioned.

The desorbing of the fuel vapor may occur while a fuel-air ratio in the ullage is below a flammability limit. The adsorption media may contain activated carbon and the desorbing of fuel vapor may include reactivating the activated carbon. The adsorption media may contain a substance other than activated carbon. Accordingly, the adsorption media may be characterized as exhibiting adsorption properties suitable for the purposes described herein. While many materials may potentially adsorb fuel vapor, those with sufficiently high surface area would be beneficial. Often, the media intended for known fuel vapor adsorption applications is evaluated for such purposes by its adsorptive capacity. Such media may be suitable for the embodiments herein. The adsorption media may exhibit a first temperature at a conclusion of the adsorbing before the desorbing begins. The desorbing of the fuel vapor may include flowing air through the media, the flowed air exhibiting a second temperature higher than the first temperature and the media being at a pressure below 14.7 pounds per square inch (psi).

In another embodiment, a fuel vapor removal method includes purging fuel vapor from ullage of a fuel tank using air added into the ullage, reducing a fuel-air ratio in the ullage using the air purging, and adsorbing the purged fuel vapor onto adsorption media.

By way of example, the fuel tank and adsorption media may be on an aircraft. The reduced fuel-air ratio may be below a flammability limit. The method may further include desorbing the fuel vapor from the adsorption media while the fuel-air ratio is below a flammability limit. The adsorption media may exhibit a first temperature at a conclusion of the adsorbing before the desorbing begins. The desorbing of the fuel vapor may include flowing air through the media, the flowed air exhibiting a second temperature higher than the first temperature and the media being at a pressure below 14.7 psi. The fuel tank and adsorption media may be on an aircraft. Also, the desorbing of the fuel vapor may occur while the aircraft is in flight. Further, the flowed air may contain ambient air and/or spent ram air, either of which may likely be below 14.7 psi while an aircraft is in flight. However, the flowed air as supplied may exhibit a pressure at or above 14.7 psi, but still allow a media pressure below 14.7 psi when the flowed air expands into the adsorber (e.g., adsorber 53) with a resulting pressure drop.

In a further embodiment, a fuel vapor removal system includes a fuel tank having ullage, an adsorption system including fuel vapor adsorption media fluidically connected to the ullage and to an ullage purging system, and a controller. The controller includes a flammability determination system and is configured to start fuel vapor removal by the purging system from the ullage onto the adsorption media before the ullage exhibits flammability.

By way of example, the system may further include a vehicle, wherein the fuel tank is a fuel tank of the vehicle and the adsorption system is on the vehicle. The vehicle may include an aircraft. The adsorption system may be an adsorption and desorption system. Thus, it may further include a fuel vapor desorption system, the controller being further configured to stop fuel vapor removal by the purging system and to start fuel vapor desorption by the desorption system while the ullage is nonflammable. The desorption system may include an air blower and an air heater fluidically connected to the adsorption media.

Also, the purging system may include an air inlet on the fuel tank and a suction pump fluidically connected to the adsorption media. The flammability determination system may include a fuel temperature sensor, a fuel tank pressure sensor, and a processor configured to determine flammability using at least a fuel temperature and a fuel tank pressure. The adsorption media may include activated carbon.

As a more specific example, system 1 in FIG. 1 includes a fuel tank 100 having ullage. An adsorption system 5 includes fuel vapor adsorption media (not shown) fluidically connected by a conduit 51 to the ullage of fuel tank 100. Adsorption system 5 also includes adsorbed fuel vapor purging system (not shown) fluidically connected thereto. System 1 includes a controller 3 having a flammability determination system. Controller 3 receives a signal 9 indicating a condition of fuel tank 100 and starts fuel tank ullage purging before the ullage of fuel tank 100 exhibits flammability. Purging is started by controller 3 sending a signal 7 to adsorption system 5, which purges the ullage onto the adsorption media.

Figure 2:
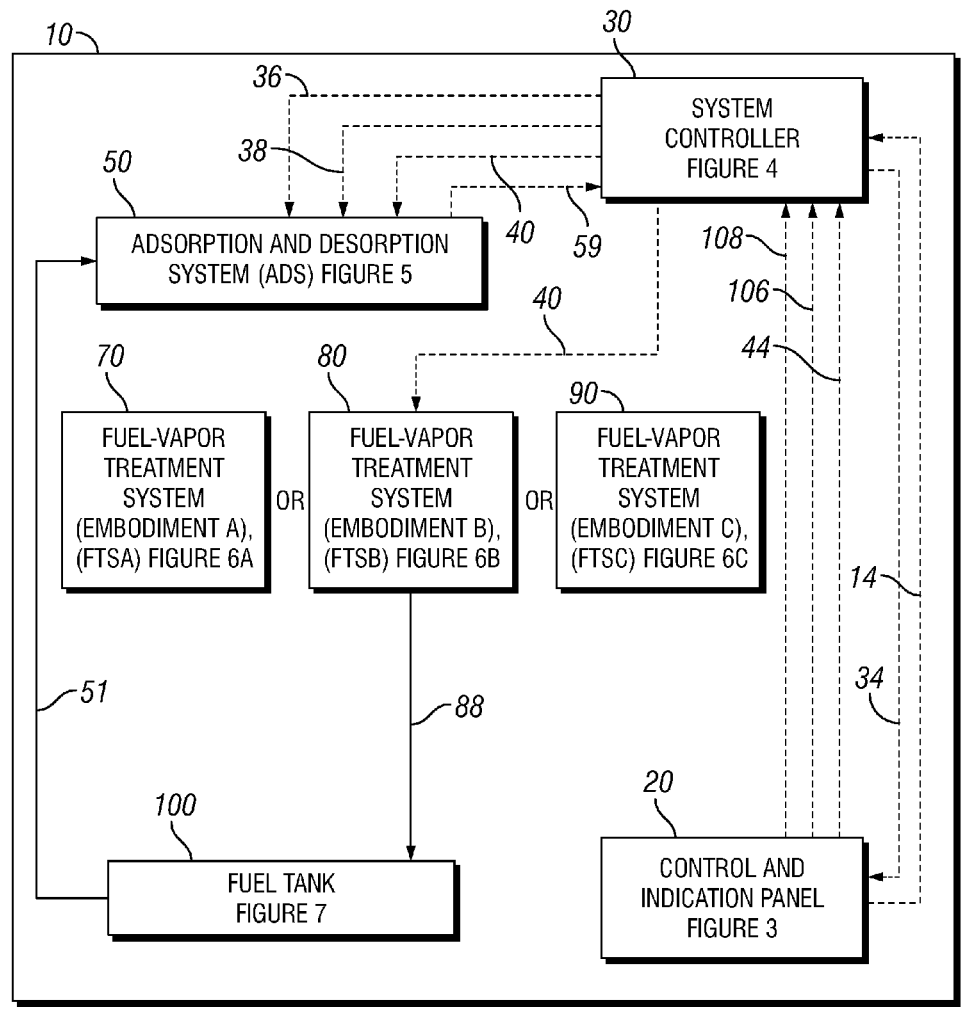
Figure 5:
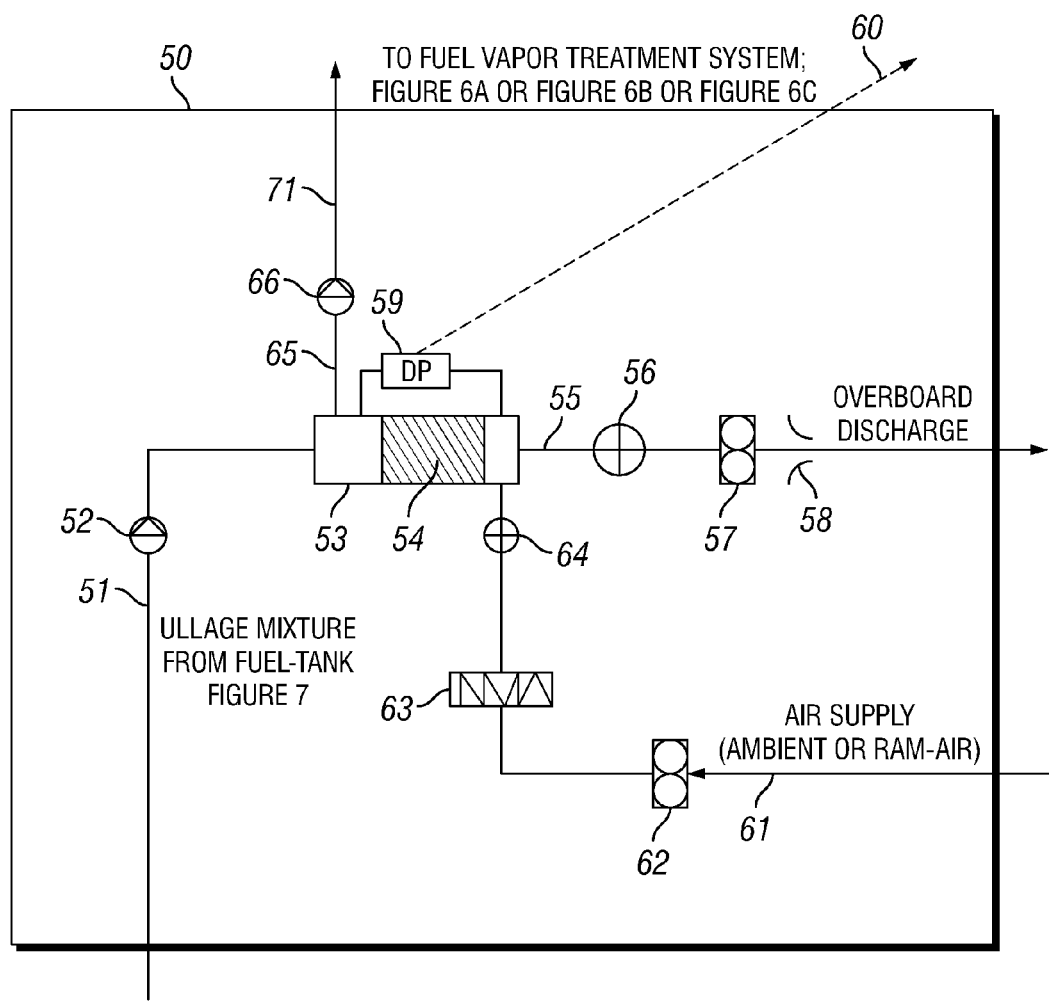
Figure 6A:
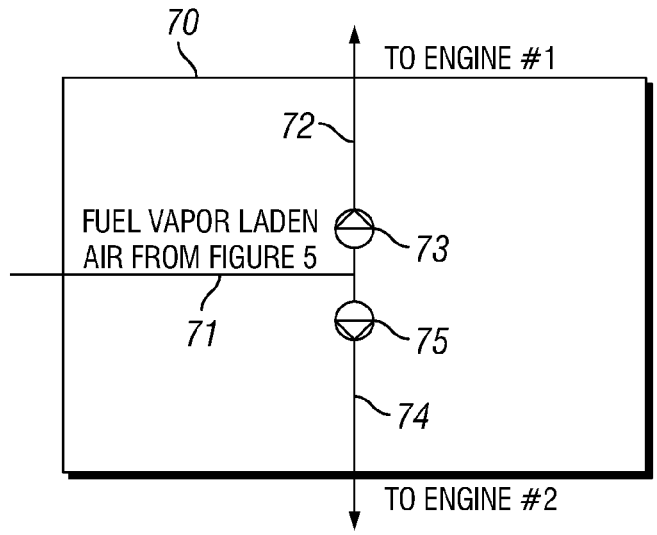
Figure 6B:
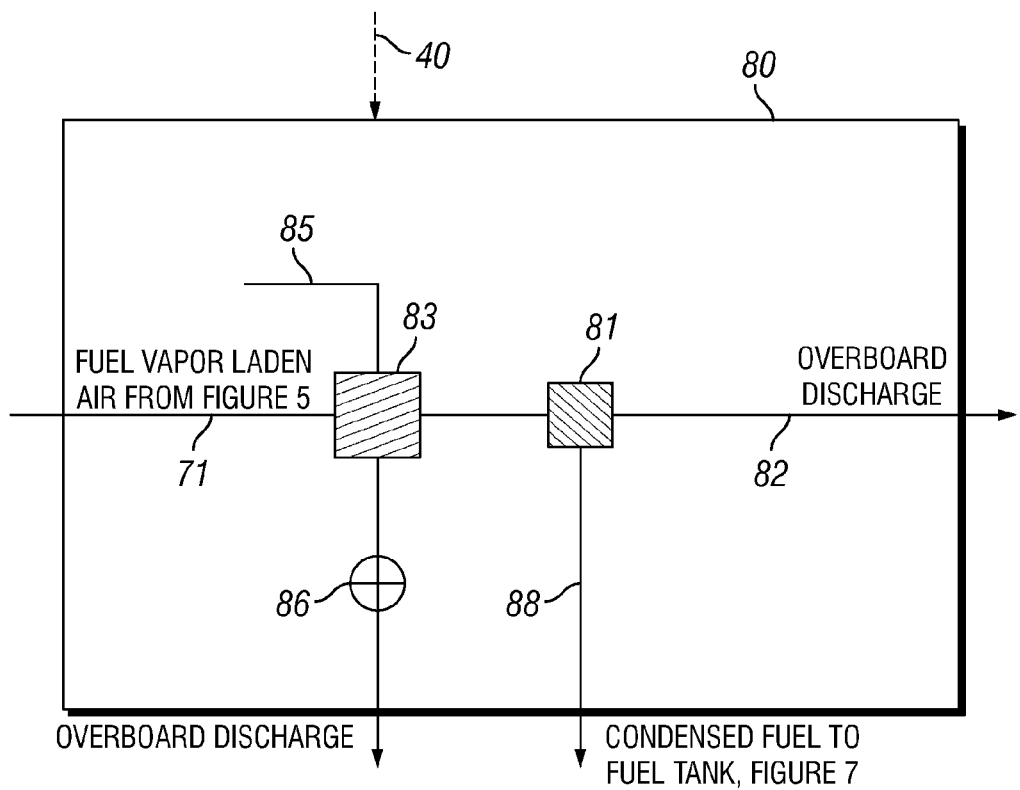
Figure 6C:
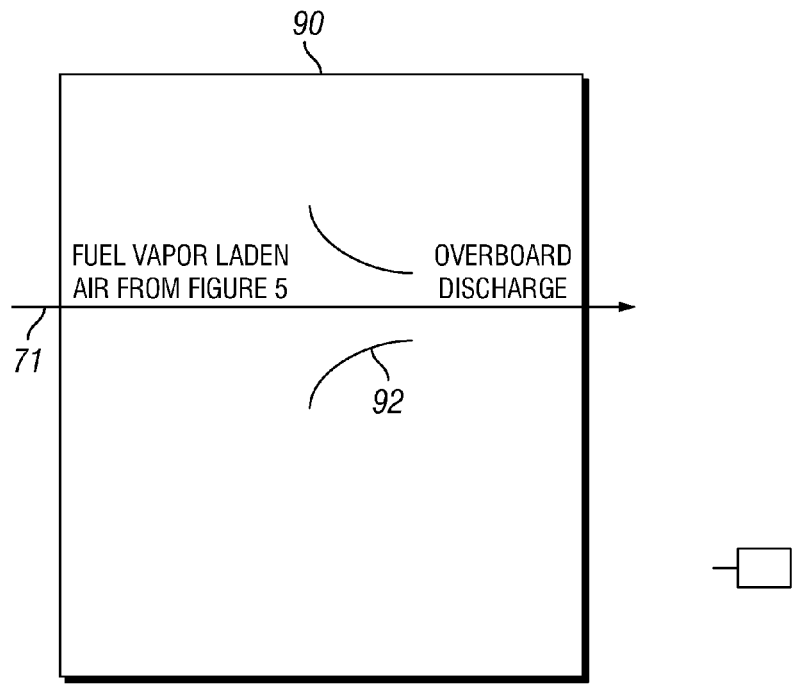

As a further example, system 10 in FIG. 2 may be on an aircraft, such as an airplane, and include: a control and indication panel 20 (detailed in FIG. 3), a system controller 30 (detailed in FIG. 4), an adsorption and desorption system 50 (detailed in FIG. 5), herein referred to as (ADS), a fuel-vapor treatment system herein referred as (FTS), and a fuel tank 100 (detailed in FIG. 6). Three embodiments of FTS are described: Embodiment A, 70, FIG. 6A (hereinafter FTSA); Embodiment B, 80, FIG. 6B (hereinafter FTSB); and Embodiment C, 90, FIG. 6C (hereinafter FTSC). Embodiment C is included with the other FTS embodiments for simplicity. However, technically, Embodiment C does not incorporate "treatment," since the fuel vapor laden exhaust from the adsorber is vented overboard during the desorption process in Embodiment C.

Figure 3:
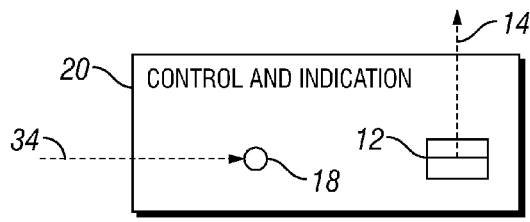
FIGS. 3-7 are schematics of some components of the FIG. 2 system shown in further detail.

FIG. 3 shows control and indication panel 20 in more detail. The panel includes a manual switch 12 for system selection. Switch 12 in the ON position provides signal 14 to system controller 30 (FIG. 4) to manage operation of ADS 50 (FIG. 5) and FTS (FIG. 6A or 6B or 6C). The operation of system 10 may be fully automatic and need not require crew action.

Panel 20 receives signal 34 from controller 30 when ADS is not operating per design. Signal 34 may be used to advise, caution, or warn. It may be used to illuminate blower indicator 18.

Panel 20 may include more or fewer indicators, e.g., fuel temperature may be added and/or blower indicator 18 may be removed. Also, panel 20 may be deleted by hardwiring system 10 such that it is powered when electrical power is available on the aircraft. Panel 20, if used, may be located in the cockpit or any other appropriate location.

Figure 4:
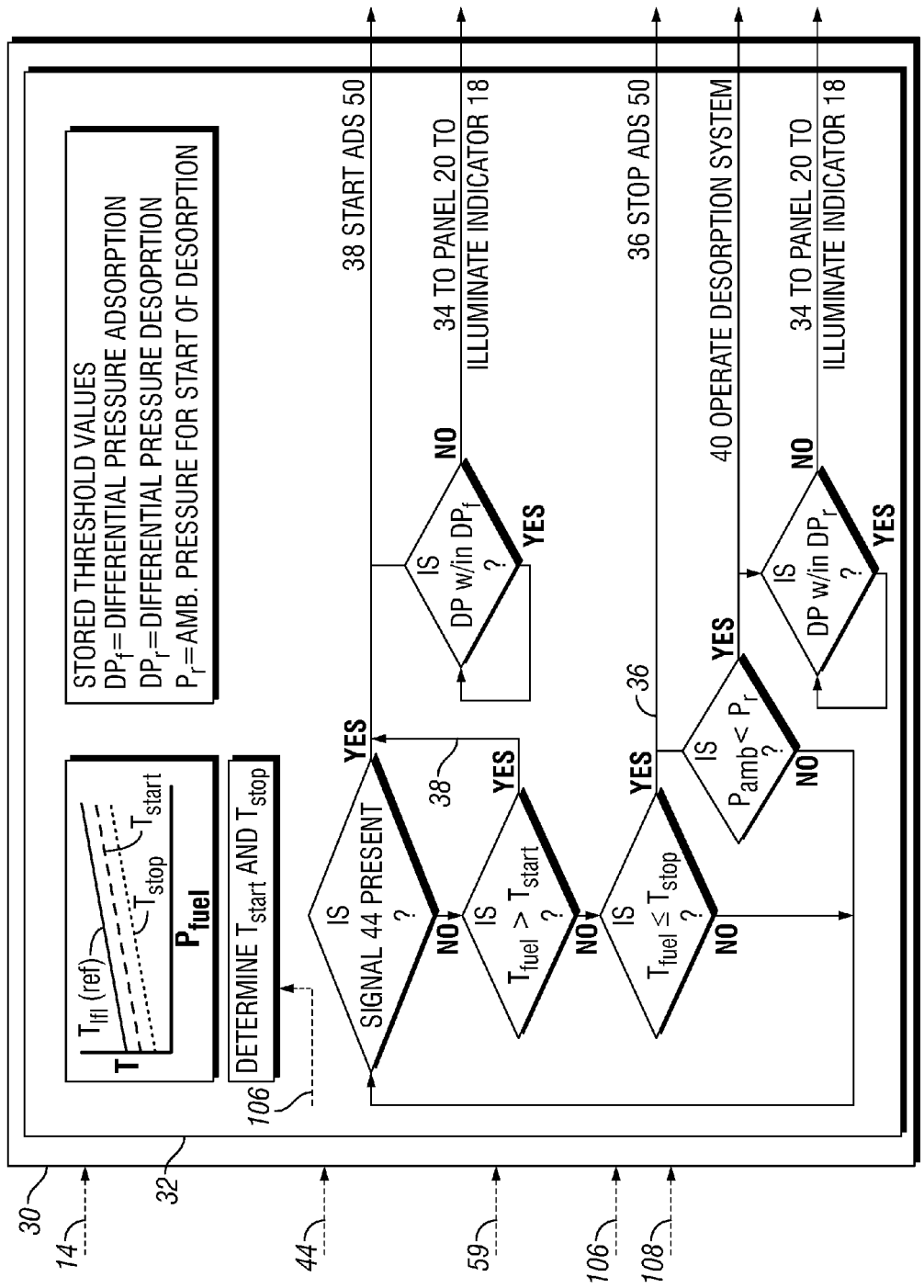

System controller 30 is shown in FIG. 4 and includes a processor 32 that receives a signal 106 from a fuel pressure sensor P transmitting $P_{fuel}$ and a signal 108 from a fuel temperature sensor T transmitting $T_{fuel}$. Controller 30 also receives a signal 44 when the fueling hose is connected to the fueling port. Other signals received and transmitted by the controller are discussed below.

Microprocessor 32 performs a number of functions on receipt of signal 14 from panel 20. Microprocessor 32 generates $T_{start}$ and $T_{stop}$ temperatures for ADS 50. It uses fuel tank pressure $P_{fuel}$ signal 106 from fuel tank pressure sensor P in FIG. 7 to generate $T_{start}$ and $T_{stop}$ temperatures by one of the following two methods: (a) table look-up using $P_{fuel}$ to determine $T_{start}$ and $T_{stop}$ from data stored in the memory of microprocessor 32 or (b) using known algorithms programmed in the microprocessor. The table-look up method may be of greater benefit. The data stored in microprocessor 32 may be of the type shown graphically in FIG. 4.

Lower flammability limit (LFL) temperatures, $T_{lfl}$ are shown in FIG. 4 as one example only. At fuel temperatures equal to the low flammability limit, the ullage may become flammable (non-inert) if the ullage is allowed to saturate with fuel vapors. In a fuel tank, when the fuel temperature is greater than $T_{lfl}$, the ullage fuel-air ratio can become greater than the combustion threshold. For Jet A fuel, the combustion threshold fuel-air ratio is approximately 0.03 from sea-level to approximately 45,000 feet. Low flammability limit temperatures are not necessarily stored in the memory of microprocessor 32. Low flammability limit temperatures are shown in FIG. 4 merely to indicate graphically that $T_{start}$ temperatures are lower than $T_{lfl}$ during all operating conditions. This ensures start of fuel-tank ullage purging at fuel-air ratios lower than the combustion threshold. The difference between $T_{lfl}$ and $T_{start}$ is a safety factor and may be selected by the system designer.

Figure 7:
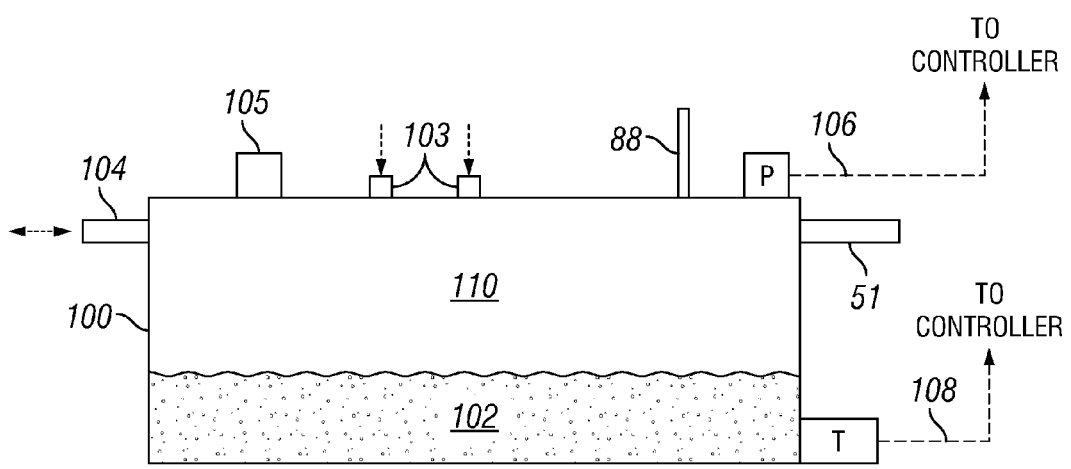

Microprocessor 32 generates signal 38 when signal 44 is present. Signal 44 indicates that the fuel servicing hose is connected to the fuel servicing port 105 (FIG. 7). Any known method to sense connection of the servicing hose to fuel servicing port 105 may be used, including a manual on/off switch. Presence of signal 44 may be used to indicate fuel vapors will discharge out of fuel tank 100 as fuel is pumped into tank 100 (FIG. 7). Signal 38 causes adsorption process to start in ADS 50. Signal 38 causes a shut-off valve 56 to open and a blower 57 to operate (FIG. 5). This causes an ullage mixture in ullage 110 to flow via a conduit 51, a check valve 52, an adsorber 53, and a shut-off valve 56 to the blower 57 (FIG. 5). Fuel vapors present in withdrawn ullage mixture are adsorbed by adsorbing media 54 and air with extremely low fuel vapor content then exhausts out to the ambient via a discharge 58. Air enters fuel tank 100 (to replace withdrawn ullage mixture volume that is not filled by the fuel entering fuel tank 100) through an ambient vent 104 and air inlet ports 103 (FIG. 7). Air inlet ports 103 may incorporate check valves to reduce ullage mixture discharge through them during aircraft climb. Also, air inlet ports 103 may be removed, for example, if ambient vent 104 is adequate alone. On removal of signal 44, signal 38 ceases. This causes valve 56 to close and blower 57 to stop operating.

Microprocessor 32 continuously performs comparative analysis of $T_{fuel}$ and $T_{start}$ temperatures and generates signal 38 when $T_{fuel}$ is greater than $T_{start}$. Signal 38 starts ADS 50 operation.

Microprocessor 32 checks for ullage mixture flow through adsorber 53 when signal 38 is present, either due to the presence of signal 44 (see above) or due to $T_{fuel} > T_{start}$ (see above). Flow verification confirms desired performance of blower 57 and adsorber 53. The verification may be performed using a differential pressure transducer 59 (FIG. 5) that transmits a signal 60 to controller 30. A differential pressure signal 60 within a design threshold DP f signifies proper blower/adsorber performance. When signal 60 is outside the selected threshold, DP f, it generates signal 34 transmitted to control and indication panel 20, FIG. 3, to illuminate blower indicator 18. DP f is stored in the memory of microprocessor 32.

Microprocessor 32 compares $T_{fuel}$ and $T_{stop}$ temperatures and generates signal 36 when $T_{fuel}$ is equal to or less than $T_{stop}$. Such condition signifies that the fuel tank temperature (and thus ullage fuel-air ratio) is less than a desired value and further purging of the fuel-tank ullage is not necessary. If the adsorption process was previously operating, then signal 36 deactivates the process by closing shut-off valve 56 and deactivating blower 57 so that no ullage mixture flows through ADS 50.

Microprocessor 32 generates signal 40 and transmits it to ADS 50 to start the desorption process when desorption system start parameters are satisfied. Desorption system starts operating when fuel tank 100 is inert (i.e. $T_{fuel} \leq T_{start}$) and the outside air pressure (Pamb) is equal to or less than a selected threshold pressure $P_r$ ($P_{amb} \leq P_r$). In the case of a vented fuel tank, fuel-tank pressure, $P_{fuel}$, is equal to the ambient pressure $P_{amb}$ and it may be used instead of $P_{amb}$. Threshold pressure $P_r$ is stored in the memory of microprocessor 32. Desorption starts below threshold pressure $P_r$ since adsorbent readily desorbs at low pressures.

Signal 40 opens a shut-off valve 64, powers a heater 63, and powers a fan of a blower 62 of ADS 50 shown in FIG. 5. Heater 63 may be electric or pneumatic (hot-air supply controlled by a valve, not shown). Blower 62 obtains air via a conduit 61. The air may be ambient air or spent air from another system, e.g., ram-air from downstream of the air-conditioning system heat exchangers (not shown). It may be beneficial for the air to be spent ram air since it is often at higher temperature than the outside ambient air. Warm air flowing through adsorber 53 desorbs fuel vapors from adsorber media 54 and fuel vapor rich air exhausts out of adsorber 53 in a conduit 65. Air in conduit 65 passes through a check valve 66 into conduit 71 that delivers the air to one of three Fuel-vapor Treatment Systems (Embodiment A, 70, FIG. 6A (FTSA); Embodiment B, 80, FIG. 6B (FTSB); and Embodiment C, 90, FIG. 6C (FTSC)). FIG. 5 shows a heater 63 to heat the air delivered by blower 62. Heater 63 may be removed if the air delivered by conduit 61 is of sufficient temperature for desorption of adsorber media 54.

As an alternative, heater 63 and blower 62 may be removed. Compressed and high temperature air from another system may be supplied via conduit 61, e.g., engine bleed-air system (all airplanes except BOEING 787) or from the compressor of the cabin conditioning system (e.g., BOEING 787). Air thus automatically flows to adsorber media 54 when signal 40 opens shut-off valve 64.

Microprocessor 32 checks for air flow through adsorber 53 when signal 40 is present. Flow verification confirms desired performance of the blower 62 and adsorber 53. Verification may be performed using differential pressure transducer 59 (FIG. 5), which transmits signal 60 to controller 30. Signal 60 being within the design threshold DP r indicates acceptable blower/adsorber performance. When signal 60 is outside the selected threshold, DP r, it generates signal 34 that is transmitted to control and indication panel 20, FIG. 3, to illuminate blower indicator 18. DP r is stored in the memory of microprocessor 32. Pressure transducer 59 and blower indicator 18 may be removed and other verification means utilized.

Microprocessor 32 automatically deactivates the desorption process when the outside pressure $P_{amb}$ increases above the threshold pressure $P_r$ or fuel temperature $T_{fuel}$ increases above $T_{start}$.

Controller 30 controls the operation of adsorption and desorption system (ADS) 50 by signals 36, 38, and 40, as described above in the discussion referring to such signals.

Fuel vapor laden air discharging from adsorber 53 flows through conduit 71 to fuel vapor treatment system FTS, such as FTSA, FTSB, or FTSC. In FTSA (FIG. 6A), conduit 71 delivers the fuel vapor laden air to (i) engine #1 via check valve 73 and conduit 72, and (ii) to engine #2 via check valve 75 and conduit 74. The fuel vapor laden air may be combusted or destroyed in engines #1 and #2 by any known method. FIG. 6A shows delivery of fuel vapor laden air to engines #1 and #2, but the air may alternatively be ducted to only one engine.

In FTSB (FIG. 6B), fuel vapor laden air discharging from adsorber 53 is delivered to a heat exchanger 83 by conduit 71. Fuel vapor laden air is cooled in the heat exchanger by ambient air delivered to the heat exchanger by a conduit 85. In FTSB, signal 40 transmitted by the controller 30 also opens the normally closed valve 86. This allows ambient air to flow through heat exchanger 83. Some of the fuel vapors condense in heat exchanger 83 and are removed by a fuel vapor separator 81. The separated (or reclaimed) fuel is returned back to fuel tank 100 via a conduit 88. Conduit 82 discharges low fuel vapor content air to outside ambient air.

In FTSC (FIG. 6C), fuel vapor laden air discharging from adsorber 53 is delivered to an exhaust nozzle 92 by conduit 71. In FTSC, the vapors are exhausted overboard. Existing regulations do not forbid the discharge of fuel vapors from fuel tanks to outside ambient air. FTSC bears the advantage of allowing selective discharge of fuel vapors at a time when ground level impact may be reduced, such as when an aircraft is at altitude.

FIG. 7 shows fuel tank 100. It contains fuel liquid fuel 102 and ullage 110. Both air and fuel vapor may be in ullage 110 and such a mixture is often referred to as ullage mixture. Fuel tank 100 is vented to the outside ambient air via a vent 104, which allows outside air to flow in and out to equalize the fuel tank pressure with ambient pressure. Air inlets 103 with check valves (not shown) may be included to allow ambient air to flow into the fuel tank. These inlets supplement air inflow when the blower 57 is operating. Fuel tank servicing port 105 allows connection of refueling hose (not shown) to servicing port 105, which causes (automatic or manual) generation of signal 44 that is transmitted to system controller 30. Fuel tank pressure sensor P provides $P_{fuel}$ signal 106 to system controller 30. Alternatively, pressure sensor P may be removed and an ambient pressure signal ($P_{amb}$) may be provided from the air data system. Fuel temperature sensor T provides $T_{fuel}$ signal 108 to system controller 30. An ullage mixture from ullage 110 flows out of fuel tank 100 to ADS 50 via conduit 51. Liquid fuel flows back to fuel tank 100 via conduit 88 from FTSB (FIG. 6B). Conduit 88 is not needed if FTSA or FTSC are used.

It is apparent from the above that system 10 may reduce ullage fuel-air ratio in fuel tank 100. System 10 starts purging the ullage mixture at temperatures lower than $T_{ff}$, thereby not allowing fuel tank 100 to become flammable. It is thus a preventive system. Also, it is apparent that system 10 may reduce ullage fuel-air ratio and render fuel tank 100 inert in the event fuel tank 100 was initially flammable (non-inert).

Several changes/enhancements in harmony with the embodiments herein can be made to the system described above. For example, grounding straps may be added to reduce the potential of fire due to static electricity. Flame arrestors may be installed to arrest flame propagation in the event of a fire. Built in test equipment may be added to detect failure of components.

System 10 installed in aircraft may operate as follows when electric power (ship's or ground) is available and activated, for example, by placing manual switch 12 in the ON position. Some differences may exist for operation in other vehicles, but those of ordinary skill will readily appreciate appropriate adaptation relying on the description herein.

While on the ground during fuel servicing at all ambient temperatures, system 10 detects fuel-servicing operations by the presence of signal 44. Signal 44 may be auto generated when the fueling hose is connected to the fueling port or it may be a manual signal. System blower 57 withdraws the ullage mixture from ullage 110 through adsorber 53 during the fuel servicing operation. Adsorber media 54 retains the fuel vapors. Ambient air enters fuel tank 100 through fuel tank vent 104 and, if provided, inlet ports 103. System 10 thus reduces airport pollution.

While on the ground at other times (not fueling), including taxi-out for takeoff and during takeoff climb, system 10 remains at standby and automatically starts operating if the fuel temperature exceeds $T_{start}$ due to fuel tank heating. Blower 57 withdraws the ullage mixture from ullage 110 through adsorber 53. Adsorber media 54 retains the fuel vapors. Ambient air enters fuel tank 100 through fuel tank vent 104 and, if provided, inlet ports 103. System 10 continues to operate for fuel temperature $T_{fuel}$ greater than $T_{stop}$. When the fuel temperature reduces below $T_{stop}$, system 10 automatically shuts down. The fuel temperature may reduce to $T_{stop}$ due to fuel tank cooling during takeoff climb.

During cruise, system 10 operates as indicated for on ground (not fueling), taxi-out, and takeoff climb. Additionally, for fuel temperature less than $T_{start}$ AND $P_{amb}$ (or $P_{fuel}$) 1 less than $P_r$, system blower 62 forces warm air through adsorber 53. Fuel vapors retained by adsorber media 54 are released to the warm air. In an alternate embodiment (without blower 62 and heater 63) warm air flows from another system (engine bleed-air or compressed air supply) through adsorber 53. Fuel vapors retained by adsorber 53 are released to the air flow. Fuel vapor laden air is supplied to the fuel vapor treatment system FTSA 70, FTSA 80, or FTSC 90. As such, adsorber media 54 is reactivated for reuse. During descent and taxi-in, system 10 operates as indicated for on ground (not fueling), taxi-out, and takeoff climb.

System 10 may use electrical power for operation of blower 57 during the adsorption process or blower 62 and heater 63 during the desorption process. Power requirements during desorption may be higher when heater 63 is electric. Nevertheless, power requirements may be significantly lower than that of a nitrogen gas inerting system (NGS) that uses an on-board inert gas generating system.

Note the adsorption system operates when the fuel temperature $T_{fuel}$ is greater than $T_{stop}$. Since the outside cold air cools the fuel tank, it is estimated that the adsorption system would operate below about 25,000 feet in a hot atmosphere. The operation may be up to lower altitudes in cooler atmospheres. The desorption process operates when the ambient pressure $P_{amb}$ (or $P_{fuel}$) is less than threshold pressure $P_r$.

A system, such as system 10, may use highly reliable components, i.e., blowers, valves, heat exchangers, fuel mist separators, sensors, and adsorbers. The blowers may be the only components with moving parts. The system may have a low failure rate and low maintenance requirements compared to NGS. Also, the system may have high reliability and availability compared to NGS. It may be possible to remove and replace failed components on line without the need of 10 days relief in MMEL currently permitted for NGS.

Recurring and non-recurring costs may be extremely low compared to NGS. All components may be state-of the art and readily available at reasonable cost. Recurring costs may be low, since the system might not require scheduled replacement of components (e.g., filters, ozone converter, ASM) like NGS.

The system may be substantially safer than NGS. NGS is designed based on an average bulk oxygen concentration of 12% oxygen in the ullage, which might not render a fuel tank non-flammable (inert) or prevent combustion and generation of fuel-tank internal pressure. The systems and methods herein instead render and maintain the fuel tank non-flammable (inert) and prevent combustion (formation of flame).

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

The above-described system and method, in various embodiments, prevents the fuel tank ullage from becoming flammable by reducing ullage fuel-air ratio. This system makes pre-existing flammable fuel tank ullage non-reactive with ignition sources (i.e., inert) by purging the fuel tank ullage with outside (ambient) air. Notably, this is an open loop system, in which ambient air flows into the fuel tank when the system is operating, and is therefore applicable to vented (i.e. unpressurized) fuel tanks.

Figure 8:
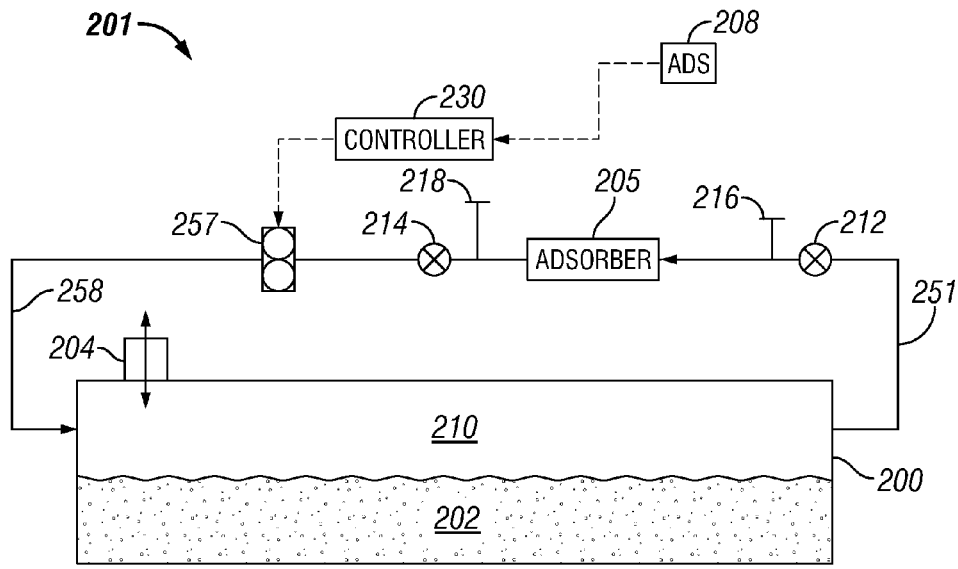
FIG. 8 is a schematic diagram of another embodiment of a system for reducing the flammability of a non-pressurized fuel-tank onboard an aircraft.

Advantageously, a closed-loop system for reducing the flammability of fuel-tanks onboard an aircraft has also been developed, various embodiments of which are shown in FIGS. 8-17. This closed-loop system can be implemented on both vented and pressurized fuel tanks, and can be simpler and lighter than some other embodiments. Shown in FIG. 8 is a schematic diagram of one embodiment of a system 201 for reducing the flammability of a non-pressurized fuel-tank onboard an aircraft using a closed-loop adsorption system, indicated generally at 201. Shown in FIG. 8 is a fuel tank 200 containing liquid fuel 202 and ullage 210. Both air and fuel vapor may be in the ullage 210, referred to as ullage mixture. The fuel tank 200 is vented to the outside ambient air via a vent 204, which allows outside air to flow in and ullage mixture to flow out to equalize the fuel tank pressure with ambient pressure. While the embodiments of FIGS. 8-11 and 13-14 depict only a single fuel tank, it is to be appreciated that the system and method disclosed herein can be used with aircraft having more than one fuel tank. Air inlets with check valves (not shown) can also be included to allow ambient air to flow into the fuel tank, as discussed above. A fuel tank servicing port (not shown) can also be provided to allow connection of a refueling hose (not shown), in the manner discussed above.

The adsorption system 201 includes a fuel vapor adsorber 205 containing adsorption media (not shown), fluidically connected by an ullage conduit 251 to the ullage 210 of the fuel tank 200. The adsorber 205 is in turn fluidically connected to a ullage pump 257, which draws the ullage mixture across the adsorber 205 and returns the ullage mixture to the ullage 210 via a return conduit 258. During adsorption, some portion of fuel vapors in the ullage mixture is adsorbed by the adsorber, and the resultant ullage mixture with lower fuel vapor content flows back to the fuel tank. Advantageously, this system can remove fuel vapors faster than they are generated by the fuel. This results in reduced ullage fuel-air ratios; lower than those that support combustion. This system thus provides for the removal of fuel vapors from the ullage mixture in a fuel tank.

The system 201 also includes a controller 230 that is operatively coupled to the ullage pump 257, and is programmed to control this pump. Advantageously, the system can utilize a simple controller that does not use fuel tank pressure and/or temperature information. That is, the controller 230 can be configured to cause the ullage pump 257 to operate whenever electrical power is available. In this embodiment the system 201 will operate whenever the aircraft can provide sufficient electrical power, such as during any normal operating condition, including when idling, as well as during taxi, takeoff, climb, cruise, descent, landing, etc. Moreover, the system 201 can be operable while an aircraft is on the ground and being provided with electrical power by an Auxiliary Power Unit (APU) or from ground-based equipment. Adsorption of fuel vapors from the ullage mixture in the ullage 210 is started by the controller 230 sending a start signal to the ullage pump 257 (as soon as electrical power is available), causing the ullage pump 257 to draw ullage mixture from the ullage 210, through the adsorber 205, and return the ullage mixture to the ullage 210. The system 201 can thus substantially continuously reduce ullage fuel-air ratio, thus preventing the fuel from becoming flammable.

The controller 230 can be programmed in other ways, too. In another embodiment, also illustrated in FIG. 8, the controller is 230 programmed with a flammability determination system, as discussed above. For example, the greatest need for fuel tank inerting is generally during non-cruise flight (e.g. during ground operations, and during taxi, takeoff and climb), when ambient conditions can significantly change the ullage fuel-air ratio. In this embodiment, the controller 230 receives signals from the aircraft data system (ADS) 208, such as altitude, climb rate, ambient temperature, ambient pressure, etc., which allow the programming of the controller to determine whether fuel inerting is desired—that is, to determine the likely condition of the fuel tank 200 and ullage 210 relative to known flammability thresholds. This can be done using a built-in database or an algorithm stored in memory that relates flight parameters to likely flammability conditions. Based on the flight parameter input and the programming of the controller 230, the controller 230 can effectively predict likely ullage conditions, and initiate fuel tank ullage purging before the ullage of fuel tank 200 is likely to exhibit flammability.

The controller 230 can be connected to a control and indication panel, which for the embodiments shown in FIGS. 8-17 can be essentially the same as that described above for the embodiments of FIGS. 1-7. The system controller and desorption logic for the embodiments shown in FIGS. 8-17 involves essentially the same control logic for the start and shutoff of the ullage pump.

The adsorber 205 can employ an activated charcoal adsorption media, as discussed above, or any other suitable media that can adsorb fuel vapors. The adsorber 205 can be configured as a line replacement unit (LRU) that is removable from the aircraft, so that it can be periodically serviced or replaced. For example, based on known characteristics of the adsorber 205, it can be scheduled for removal and replacement after a certain number of hours of use based on a presumption that it is approaching saturation, or if a specific indication of a need for replacement is received. The replacement adsorber can be a new one or an adsorber that has been serviced and restored. The partially saturated adsorber can then be serviced and restored at a maintenance facility to remove or desorb fuel vapors, after which it is then ready to be reinstalled into an aircraft, replacing another partially saturated adsorber, and so on. In this way, an aircraft can always have an adsorber that has adequate capacity for adsorbing fuel vapors.

Alternatively, rather than being replaced with a new or serviced adsorber, the adsorber can be serviced by maintenance personnel on the ground while still installed on the aircraft. For this purpose, a pair of valves 212, 214 can be provided in the ullage line 251 both upstream and downstream of the adsorber 205, so that the adsorber 205 can be isolated from the fuel tank 200. A pair of connection ports 216, 218, which are normally closed, can be provided to allow a ground desorption unit (not shown) to be attached by maintenance personnel for servicing of the adsorption unit. The desorption unit can be designed to provide a flow of air through the adsorber, such as in a direction that is opposite to the normal flow of ullage, for a specified time. This flow of desorption air draws the fuel vapors from the adsorber media, and restores the adsorption capacity of the adsorption media. Fuel vapor that is exhausted during ground desorption can be vented to the atmosphere or disposed of in some other suitable way, or it can be recovered, if desired. Desorption can be further promoted by warming the flow of desorption air and lowering its pressure relative to the atmosphere. After desorption, the adsorber's capacity is restored to a suitable level for continued use.

Over time, even with periodic purging or restoring of the adsorber 205, the adsorption media will gradually lose its ability to adsorb fuel vapors. Consequently, even where periodic ground maintenance is performed, the adsorber 205 can be removed and replaced by maintenance personnel when desired.

Figure 9:
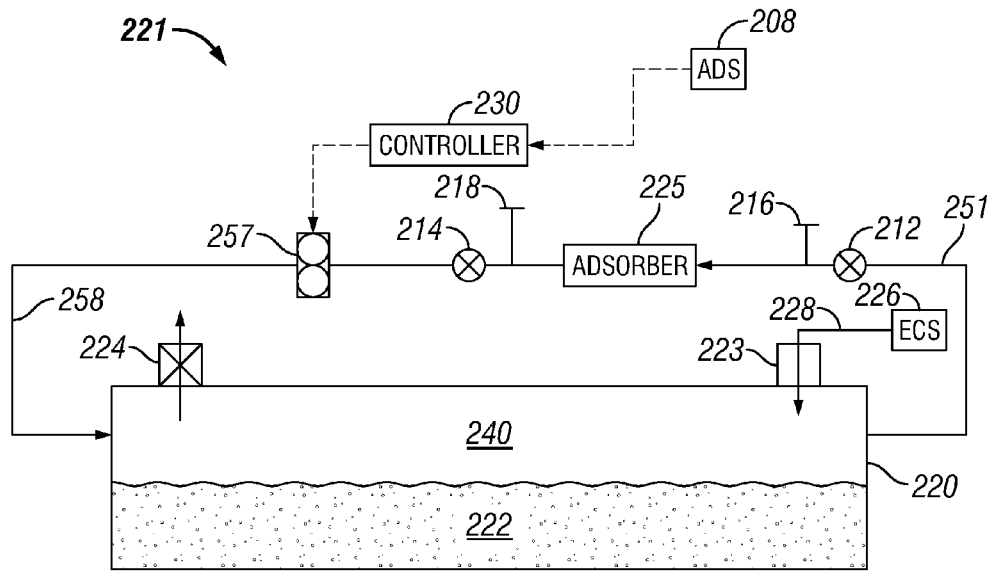
FIG. 9 is a schematic diagram of an embodiment of a system like that of FIG. 8 for a pressurized fuel-tank.

Advantageously, the closed-loop adsorption methodology can also be applied to pressurized fuel tanks. Shown in FIG. 9 is a schematic diagram of an embodiment of a closed-loop adsorption system like that of FIG. 8, but configured for a pressurized fuel-tank 220. Elements in this system 221 that are like those of the embodiment of FIG. 8 are designated with common reference numerals. This system 221 includes a pressurized fuel tank 220 containing liquid fuel 222 and ullage 240. The fuel tank 220 includes a pressure inlet 223 that is connected to the aircraft Environmental Control System (ECS) 226 via a pressure conduit 228 to pressurize the fuel tank 220 using bleed air from the ECS, in a conventional manner. Excess pressure in the tank 220 can be vented to the outside via a vent outlet 224, which is a one-way valve, and only allows ullage mixture to flow out of the tank 220 when an overpressure condition occurs. As a pressurized system, ambient air does not flow into the fuel tank 220. Other features (not shown) to allow refueling and servicing can also be associated with the tank 220, as discussed above.

In this system 221 the fuel vapor adsorber 225 can be similar to that of FIG. 8, except that it is configured for operation in a higher pressure environment, given that the fuel tank 220 is pressurized. The adsorber 225 contains adsorption media, and is fluidically connected by an ullage conduit 251 to the ullage 240 of the fuel tank 220. A ullage pump 257 or other pumping device draws the ullage mixture through the ullage conduit 251, across the adsorber 225, and returns the ullage mixture having a lower fuel vapor concentration to the ullage 240 via the return conduit 258.

The system 221 includes a controller 230 that is operatively coupled to the ullage pump 257, and can be programmed to operate in the manner discussed above with respect to FIG. 8. That is, for the system shown in FIG. 9, the controller 230 can be configured to cause the ullage pump 257 to operate whenever electrical power is available, in the manner discussed above, so that the system 201 can substantially continuously reduce ullage fuel-air ratio, thus preventing the ullage from becoming flammable.

Alternatively, the controller 230 can be programmed with a flammability determination system, as discussed above, and activate the ullage pump 257 when fuel inerting is desired. That is, based on input from the aircraft data system 208, for example, the controller can be programmed to determine the likely condition of the fuel tank 200 and ullage 210 relative to known flammability thresholds. This can be done using a built-in database or an algorithm stored in memory that relates flight parameters to likely flammability conditions. Based on the flight parameter input and the programming of the controller 230, the controller 230 can effectively predict likely ullage conditions, and initiate fuel tank ullage purging before the ullage of fuel tank 220 is likely to exhibit flammability. As with the embodiment of FIG. 8, the adsorber 225 of FIG. 9 is configured to be removable from the aircraft, so that it can be periodically changed and/or serviced.

Figure 10:
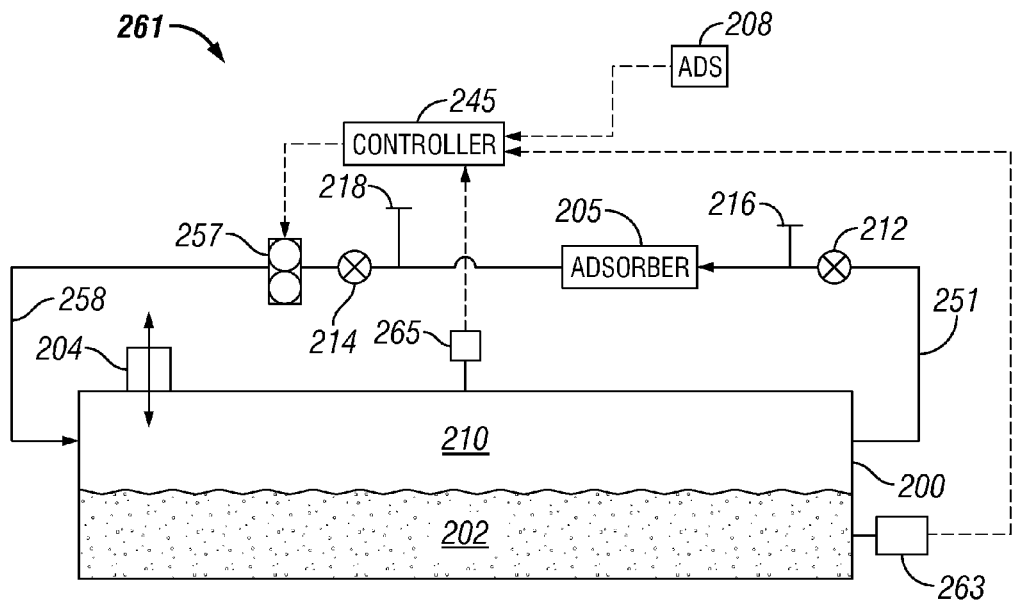
FIG. 10 is a schematic diagram of an embodiment of a system for reducing the flammability of a non-pressurized fuel-tank onboard an aircraft, this system including temperature and pressure sensors associated with the fuel tank.

A schematic diagram of another embodiment of a closed-loop fuel ullage adsorption system 261 for a non-pressurized aircraft fuel-tank 200 is shown in FIG. 10. Like the embodiment of FIG. 8, this system includes a fuel tank 200 containing liquid fuel 202 and ullage 210. The fuel tank 200 is vented to the outside ambient air via a vent 204, which allows outside air to flow in and out to equalize the fuel tank pressure with ambient pressure. Other features to allow refueling and servicing, etc. can also be associated with the tank 200 and adsorber 205, as discussed above.

The adsorption system 261 of FIG. 10 includes a fuel vapor adsorber 205 containing adsorption media (not shown), fluidically connected by an ullage conduit 251 to the ullage 210 of the fuel tank 200. The adsorber 205 is in turn fluidically connected to a ullage pump 257 or other pumping device that draws the ullage mixture across the adsorber 205 and returns the ullage mixture to the ullage 210 via a return conduit 258. As with the embodiments discussed above, the adsorber 205 is removable from the aircraft, so that it can be periodically changed and/or serviced.

Advantageously, the system 261 also includes a fuel temperature sensor 263 and an ullage pressure sensor 265, which are associated with the fuel tank 200. The temperature sensor 263 and pressure sensor 265 are interconnected with the controller 230, which is also operatively coupled to the ullage pump 257, and the aircraft data system 208. A controller 245 is coupled to the ullage pump 257, and programmed with a flammability determination system, which can determine whether and when fuel inerting is desired. In this embodiment, the controller 245 receives signals from the aircraft data system 208, as discussed above, and also receives fuel temperature and ullage pressure signals from the temperature sensor 263 and pressure sensor 265. Based on this input, the controller 245 can initiate fuel tank ullage adsorption whenever actual ullage conditions warrant it, rather than either based on a prediction of likely ullage conditions, or substantially continuously, as in the embodiments of FIGS. 8 and 9.

Figure 12:
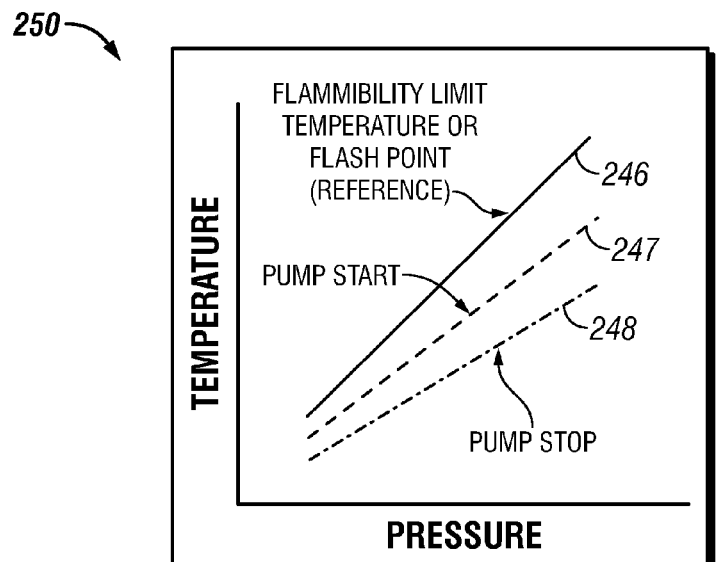
FIG. 12 is a graph showing the relationship of ullage adsorption start and stop times to flammability limits of ullage mixture as a function of temperature and pressure.

Using a built-in database or an algorithm stored in memory, the system controller 245 can determine the ullage pump start and stop temperatures based on the known relationship between temperature, pressure and flammability for the particular type of fuel. Provided in FIG. 12 is an exemplary graph 250 showing the relationship of ullage adsorption start and stop times to flammability limits of ullage mixture as a function of temperature and pressure for a given fuel type. In this graph, a flammability limit curve 246 is shown as a function of temperature and pressure, relative to an exemplary pump start curve 247 and pump stop curve 248. This graph or its numerical or computational equivalent is stored in the programming of the controller 245, and allows the controller 245 to determine when to start and stop the ullage pump 257.

As discussed above, when the ullage pump 257 operates, it withdraws the ullage mixture 210 consisting of fuel vapors and air. Some portion of the fuel vapors are adsorbed by the adsorber 205, and the resultant ullage mixture with lower fuel vapor content flows back to the fuel tank 200. The system can remove fuel vapors faster than they are generated by the fuel. This results in reduced ullage fuel-air ratio, and thus reduces flammability. The fuel vapors generated by the fuel depend, in part, on the temperature of the fuel. As fuel evaporates the remaining fuel in the fuel-tank gets cooler and the evaporation rate decreases if no heat flows into the fuel tank. If heat flows into the tank then some of the heat is retained by the fuel and fuel tank structure to raise its temperature, some gets dissipated and only a fraction goes to vaporize the fuel. If heat flows out of the fuel tank and fuel temperature decreases then the evaporation rate decreases. The heat of evaporation of Jet A, Jet A-1 fuel is approximately 145 Btu/lb. Fuel-tank pressure has no effect on fuel evaporation rate, but it affects the fuel-air ratio as the air density of air in the fuel tank changes.

Advantageously, the system shown in FIG. 10 uses this fuel property to reduce ullage pump operating time and extend adsorber operating time. For safety, the temperatures associated with the ullage pump start curve (247 in FIG. 12) and the ullage pump stop curve (248 in FIG. 12) can be selected significantly below the fuel flash point temperature curve (246 in FIG. 12) for the design ignition energy source threat. For example, the flash point of Jet A fuel is approximately 100° F. at sea-level pressure. At this pressure, the controller 230 can be programmed to select a pump start temperature of 70° F. and a pump stop temperature of 60° F. The ullage pump starts to operate when the fuel temperature is greater than the start temperature and shuts off when the fuel temperature is less than the stop temperature.

Figure 11:
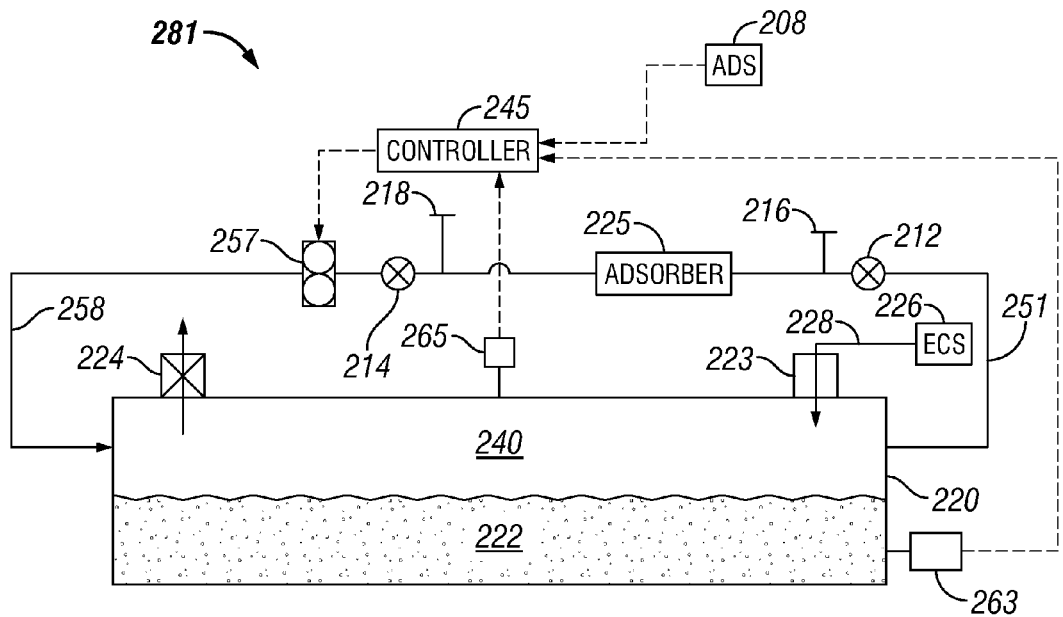
FIG. 11 is a schematic diagram of an embodiment of a system like that of FIG. 10 for a pressurized fuel-tank.

Provided in FIG. 11 is a schematic diagram of an embodiment of a system 281 like that of FIG. 10, but configured for a pressurized fuel tank 220. Elements in this system 281 that are like those of the embodiment of FIG. 9 are designated with common reference numerals. This system 281 includes a pressurized fuel tank 220 containing liquid fuel 222 and ullage 240. The fuel tank 220 includes a pressure inlet 223 that is connected to the aircraft Environmental Control System (ECS) 226 via a pressure conduit 228 to pressurize the fuel tank 220 using bleed air from the ECS 226. Excess pressure in the tank 220 can be vented to the outside via a vent outlet 224, which is a one-way valve, and only allows air to flow out of the tank 220 when an overpressure condition is recognized. As a pressurized system, ambient air does not flow into the fuel tank 220. Other features to allow refueling and servicing can also be associated with the tank 220 and adsorber 225, as discussed above.

Advantageously, the system 281 also includes a fuel temperature sensor 263 and a ullage pressure sensor 265, which are associated with the fuel tank 220. The temperature sensor 263 and pressure sensor 265 are interconnected with a controller 245, which is also operatively coupled to the ullage pump 257, and the aircraft data system 208. The controller 245 is programmed with a flammability determination system, which can determine when fuel inerting is desired in the manner discussed above with respect to FIG. 10. The controller 245 receives signals from the aircraft data system 208, and from the temperature sensor 263 and pressure sensor 265. Based on this input, the controller 245 can initiate fuel vapor adsorption based on the mathematically known relationship between temperature, pressure and flammability for the particular type of fuel, as discussed above with respect to FIG. 12. When activated, the pump 257 pumps ullage mixture through the adsorber 225, which is suitable for a pressurized fuel system, so that fuel vapors are adsorbed, and the reduced fuel-air ratio ullage mixture is returned to the fuel tank 220 via the return line 258. Again, the adsorber 225 is removable from the aircraft, so that it can be periodically changed and/or serviced.

Figure 13:
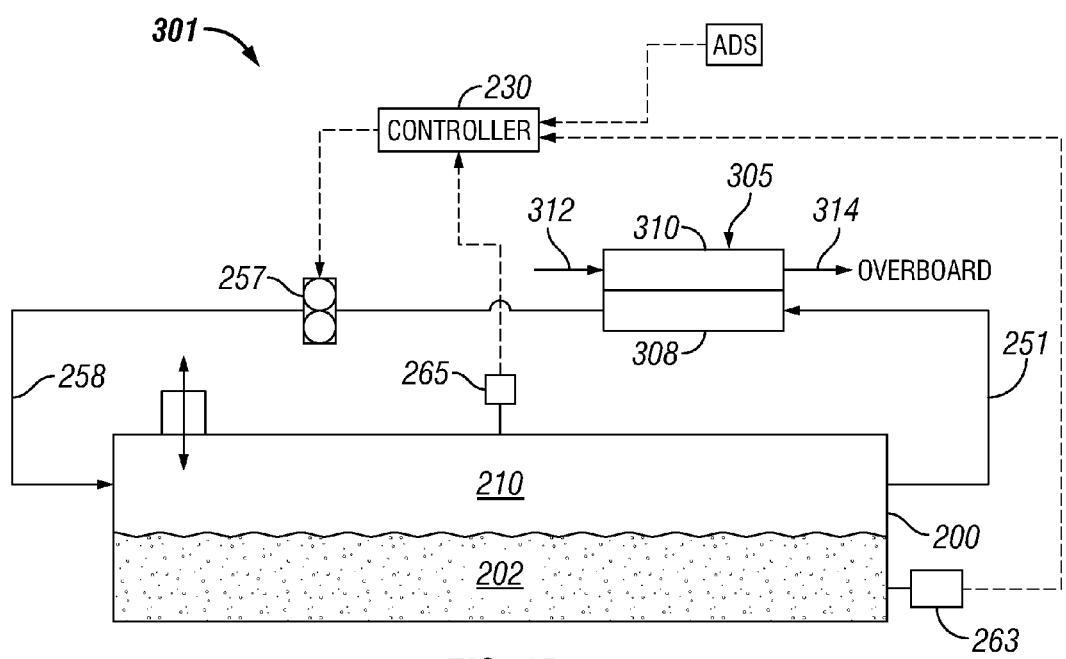
FIG. 13 is a schematic diagram of an embodiment of a system for reducing the flammability of a non-pressurized fuel-tank onboard an aircraft, this system employing a twin adsorber unit.
Figure 14:
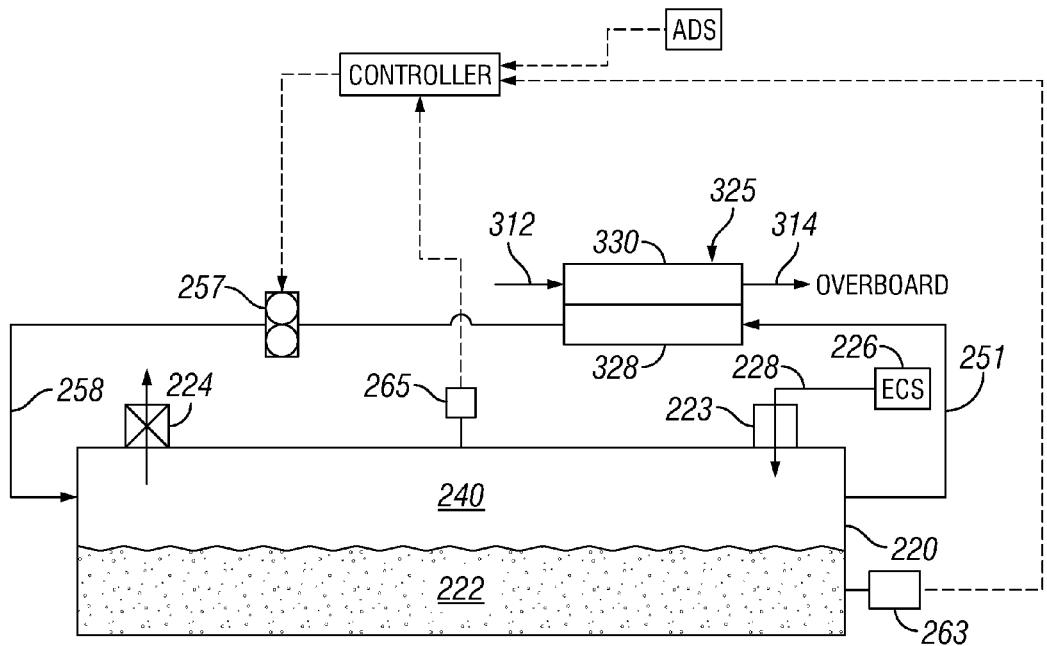
FIG. 14 is a schematic diagram of another embodiment of a system like that of FIG. 13, for a pressurized fuel-tank.

Provided in FIG. 13 is a schematic diagram of another embodiment of a closed-loop ullage adsorption system 301 that employs a twin adsorber 305, or what can be called an adsorber and desorber unit. FIG. 14 provides a schematic diagram of a system like that of FIG. 13, but for a pressurized fuel-tank. Elements of FIGS. 13 and 14 that are the same as corresponding elements in FIGS. 10 and 11, respectively, are designated with common reference numerals. In the embodiment of FIG. 13, the adsorber and desorber unit 305 includes a first adsorber chamber 308 and a second adsorber chamber 310, and is configured such that one chamber acts as an adsorber while the other is being desorbed. For example, when a first adsorber chamber (e.g. 308) operates in adsorption mode (adsorbing fuel vapors) the second adsorber chamber (e.g. 310) is being restored or recharged (i.e., desorbed). When the first adsorption chamber 308 nears saturation, the twin adsorber unit 305 is switched, so that chamber 310 now operates in adsorption mode and chamber 308 moves to recharge or desorption mode.

Both adsorber chambers 308, 310 are provided with adsorption media, but the two chambers are fluidly isolated from each other. In a first position, shown in FIG. 13, a first adsorber chamber 308 is disposed in line with the ullage conduit 251, and receives ullage mixture in the manner discussed above. After adsorption, these vapors are returned to the ullage 210 by the ullage pump 257 via the ullage return conduit 258, in the manner discussed above.

The second adsorber chamber 310 is disposed in line with a recharge air conduit 312, which provides a flow of air through the second adsorber chamber 310. This air can come from various sources. For example, it can be ram-air or it can be warm air extracted downstream from the ECS heat exchangers. Alternatively, the air can be equipment cooling air that is normally dumped overboard. It is desirable to use warm air for adsorber recharge, and it is also desirable for this air to be at low pressure. Higher temperature and lower pressure (either or both) help strip fuel particles from the adsorber medium, and help to reduce recharge time. This recharge air flow draws fuel vapors from the adsorber media, which has the effect of recharging the adsorber media, thus restoring its adsorptive capacity. The fuel particles that are stripped from the adsorber medium are carried away by the recharge air flowing through the adsorber, and discharged overboard via a recharger outlet 314.

Advantageously, the twin adsorber 305 is switchable between its two positions, to selectively place the first adsorber chamber 308 and the second adsorber chamber 310 in either position. That is, while one adsorber chamber is in fluid communication with the ullage conduit 251 and operating to remove fuel vapors from the ullage mixture, the other is aligned with the recharge air conduit 312 and recharged with a flow of air, and vice versa. The adsorbers are periodically switched so the "refreshed" adsorber becomes the fuel vapor adsorber. The switching function may be performed manually (e.g. via maintenance personnel) or automatically (e.g. using a mechanical switching device aboard the aircraft). When the first adsorber reaches or nears its saturation point, the twin adsorber 305 is switched to reverse the relative position of the two adsorption chambers, so that the recharged adsorption chamber takes over adsorption duties, while the one that was nearer saturation begins recharging.

The embodiment of FIG. 13 is for a non-pressurized fuel tank. FIG. 14 shows a similar system having a switchable twin adsorber 305 for a pressurized fuel tank. For adsorption operation, this embodiment operates like the embodiments of FIGS. 9 and 11. The fuel tank 220 includes a pressure inlet 223 to pressurize the fuel tank 220 using bleed air from the ECS, and a one-way vent outlet 224, to allow ullage mixture to flow out of the tank 220 when an overpressure condition is recognized. However, the embodiment of FIG. 14 also includes a twin adsorber 325 that is configured for a pressurized fuel system, but otherwise operates like that shown in FIG. 13. This twin adsorber 325 allows one adsorber chamber (e.g. 308) to be in operation while the other chamber (e.g. 310) is recharged, and vice versa, as discussed above.

Figure 15:
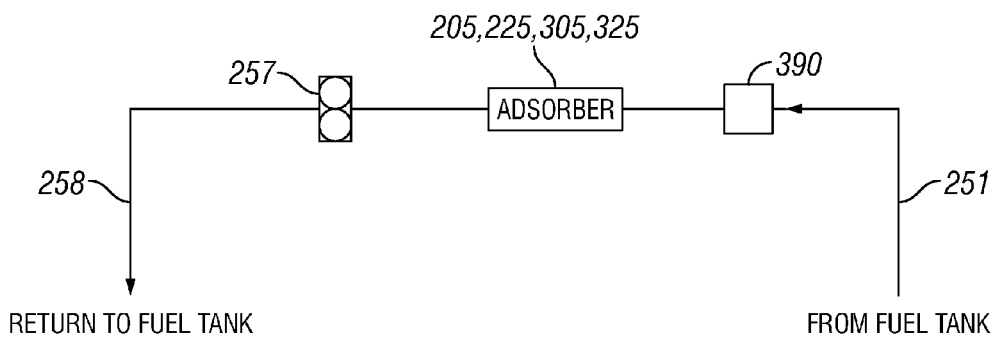
FIG. 15 is a partial schematic diagram of a system for reducing the flammability of a non-pressurized fuel-tank onboard an aircraft in accordance with the present disclosure, this system including a prefilter.

Another feature that can be used with any of the closed-loop fuel ullage adsorption systems disclosed herein is shown in FIG. 15. This figure provides a partial schematic diagram of a closed-loop fuel ullage adsorption system that includes a prefilter 390. The prefilter is interposed in the ullage conduit 251 upstream of the adsorber unit 205/225/305/325. The prefilter 390 filters out fuel mist (i.e. fuel droplets) to reduce the load on the adsorber. This prefilter 390 can remove condensed fuel vapors (fuel mist) that may exist in the ullage mixture due to fuel vapor condensation or fuel sloshing, for example. The pre-filter reduces the load on the adsorber 205/225/305/325.

Various materials can be used in the pre-filter 390, such as human air and animal fur, which have a high affinity for oil. Other appropriate materials can also be used. During operation, the ullage mixture, laden with fuel vapors and fuel droplets (or mist), flows through the ullage conduit 251 and passes through the pre-filter 390, which removes the fuel droplets. The ullage mixture devoid of fuel droplets then flows through the adsorber 205/225/305/325 which adsorbs the fuel vapors. The ullage mixture with low fuel vapor content then flows back to the fuel tank 200/220, in the manner discussed above. This process continues whenever the ullage pump is operating.

Figure 16:
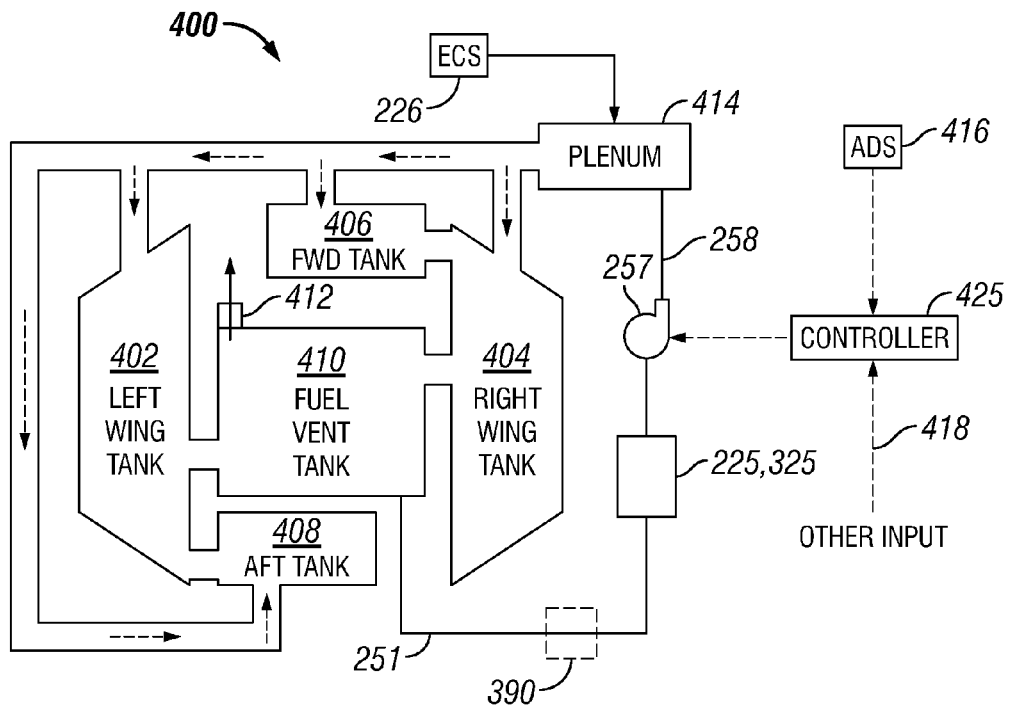
FIG. 16 is a schematic diagram of an embodiment of a system for reducing the flammability of a pressurized fuel-tank onboard a high performance aircraft.

Advantageously, the system disclosed herein can also be used with high performance military aircraft. Fuel tanks offer a great challenge for military aircraft because of their flammable content and large exposed areas. In some combat situations, approximately 40% of aircraft losses have been attributed to fuel system hits. Improvement in fuel tank survivability is thus desirable in all types of fixed- and rotary-wing military aircraft. Shown in FIG. 16 is a schematic diagram of another embodiment of a closed-loop fuel ullage adsorption system 400 that can be used onboard a high performance aircraft. The aircraft in this example includes left and right fuel tanks 402, 404, and fore and aft fuel tanks 406, 408. These fuel tanks are all fluidly connected to a common fuel vent tank 410, and are at the same pressure. A vent and pressurization valve 412 is provided in the fuel vent tank 410 to maintain the fuel tanks at the desired pressure by allowing ullage mixture to vent through the overboard vent outlet if an overpressure condition occurs. The fuel tanks are also in fluid communication with a plenum 414, which is pressurized using bleed-air from the ECS 226; this interconnection causes all fuel tanks to pressurize to the same pressure, and causes the ullage mixture from all tanks to commingle.

An adsorber system is in fluid communication with the fuel vent tank 410, and includes an ullage conduit 251, an adsorber 225/325, a ullage pump or blower 257, and a return conduit 258 that directs the reduced fuel-air ratio ullage mixture to the plenum 414. The pressurized closed-loop fuel ullage adsorption system 400 shown in FIG. 16 operates like that shown in FIG. 14. Though not shown, a pressure sensor can be associated with the fuel vent tank 410, and temperature and pressure sensors can be provided with one or more of the fuel tanks.

A controller 425 is operatively coupled to the ullage pump 257, and receives input from the aircraft data system 416 and other input, designated 418, which can include signals from the temperature and pressure sensors. Based on the input, the controller 425, using a built-in flammability limit database or algorithm, determines the ullage pump start and stop temperatures. Gases from the fuel vent tank 410 are withdrawn by the ullage pump 257 through the adsorber 225/325 when the ullage pump 257 operates.

Figure 17:
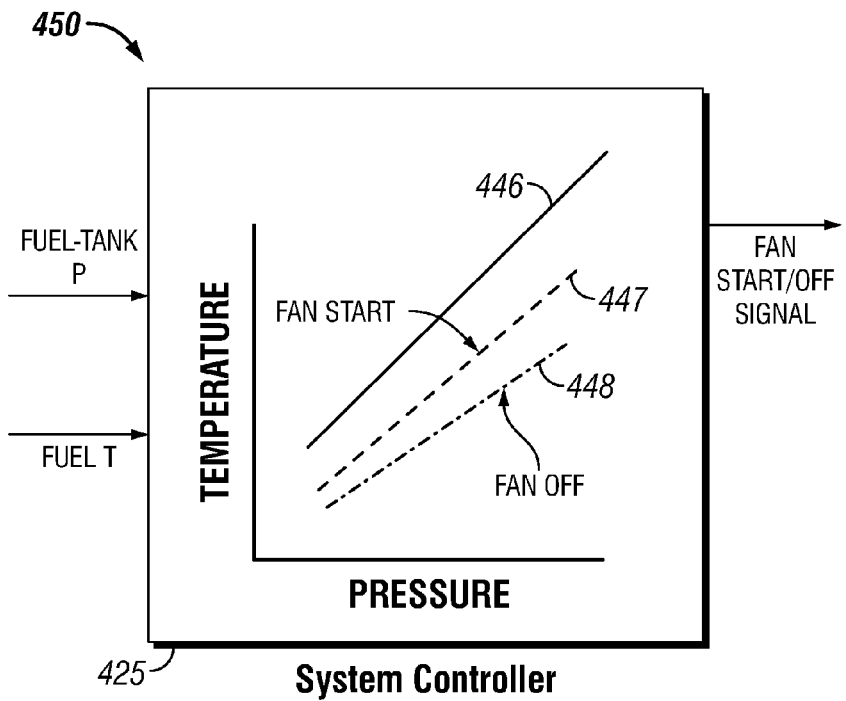
FIG. 17 is a graph relating the relationship of ullage adsorption start and stop times as a function of temperature and pressure, as incorporated into programming of the system controller.

Shown in FIG. 17 is an exemplary graph 450 of a flammability limit curve or fuel flash point curve 446 for fuel in the tank as a function of temperature and pressure. This graph shows the relationship of the flammability limit curve 446 to the pump start temperature curve 447 and pump stop temperature curve 448. This graph or its numerical or computational equivalent can be stored in the programming of the controller 425, and allows the controller 425 to determine when to start or stop the ullage pump 257. These temperatures can be selected significantly below the fuel flash point curve 446 for the design ignition energy source threat. As with the embodiments discussed above, the adsorber 225/325 can be removable from the aircraft for periodic maintenance or replacement, or it can be a switchable twin adsorber unit, as shown in FIGS. 13 and 14. A prefilter 390, like that shown in FIG. 15, can also be used with the embodiment of FIG. 16.

The system and method disclosed herein is thus believed to provide good asset survivability for military aircraft under many different conditions, including combat conditions. It is also believed to help minimize damage to assets, and can help minimize the time required for battle damage repairs and for readiness, asset attrition rate, and potential loss of life.

Figure 18:
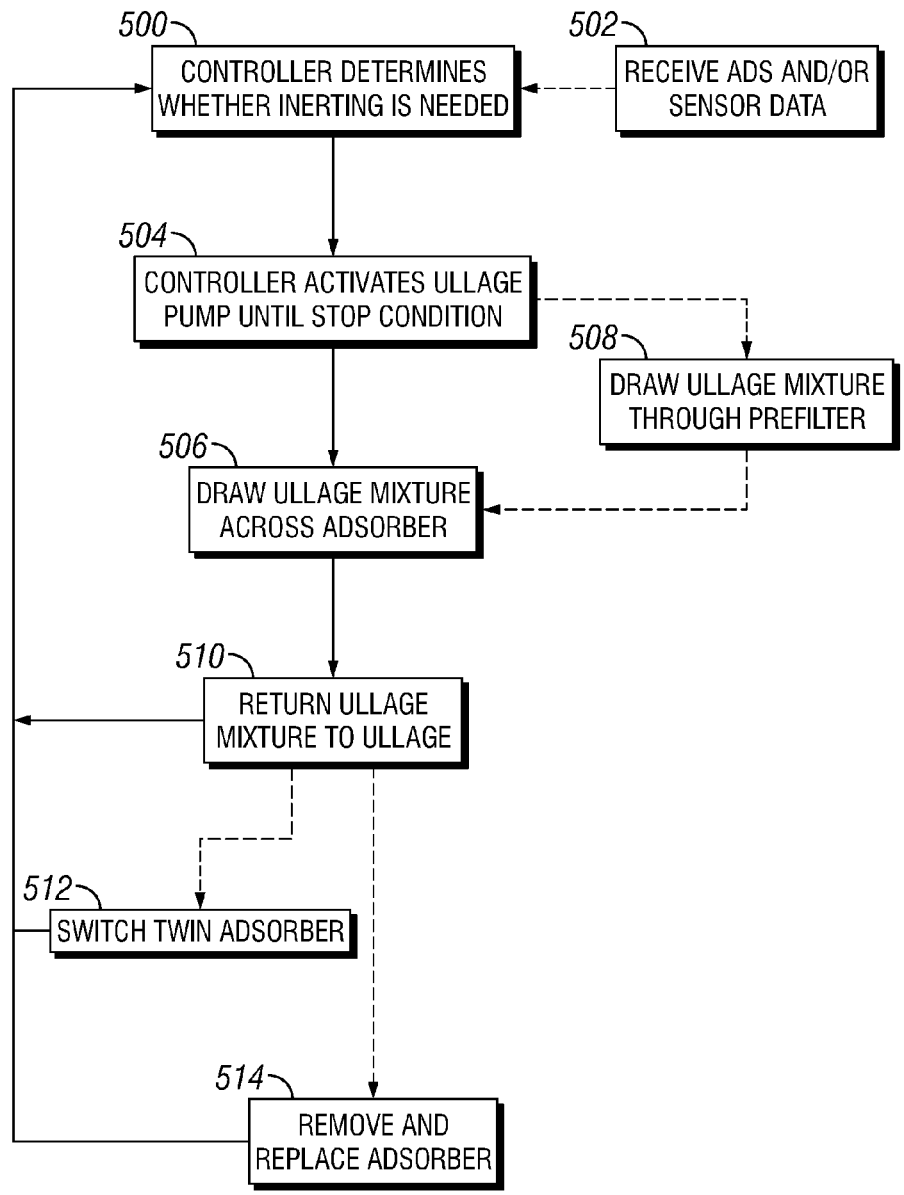
FIG. 18 is a block diagram of a method for reducing flammability in an aircraft fuel tank using a closed-loop adsorption system in accordance with the present disclosure.

An embodiment of a method for reducing flammability in an aircraft fuel tank in accordance with the present disclosure is outlined in the block diagram of FIG. 18. The system controller first determines whether inerting is needed (block 500), which can involve receiving and interpreting input data (block 502), such as ADS data and/or sensor data. The controller then activates the ullage pump (block 504), which draws ullage mixture through the adsorber (block 506). Optionally, the ullage mixture can be directed through a prefilter (block 508) prior to contact with the adsorber. Following adsorption, the ullage mixture are then directed back into the ullage (block 510). As noted in block 504, this process continues until the controller provides a stop signal to the ullage pump. At that point the system resets to block 500, awaiting a new signal from the controller.

The block diagram of FIG. 18 illustrates the basic steps in all of the embodiments disclosed herein. In the embodiments of FIGS. 8 and 9, the controller provides a start signal to the ullage pump (block 504) whenever it has electrical power, or, alternatively, whenever its programming indicates a likely need for fuel tank inerting, such as based on aircraft operation parameters. Other embodiments disclosed above use a variety of input to the controller, such as fuel temperature and pressure sensors, etc., to allow the controller to determine actual ullage conditions based on a flammability limit program and determine when to start and stop the ullage pump.

At any point in this process, most likely at a point when the ullage pump is not operating, if the system is so configured the controller can switch a twin adsorber unit (block 512) to engage a second adsorber chamber, as discussed above, and provide recharge flow to the first chamber, for recharge during flight. Alternatively, the adsorber can be removed and replaced or recharged (block 514) by maintenance personnel on the ground.

The embodiments of the system disclosed herein thus provide a closed-loop system and method for reducing the flammability of fuel tanks on board aircraft of various types, such as commercial and military aircraft. Indeed, flammability reduction on commercial airlines is required by Federal Aviation Administration (FAA) regulations. The system disclosed herein provides a way to reduce the flammability of fuel tanks on board an aircraft and it can be used for both unpressurized and pressurized fuel tanks. The method removes fuel vapors from the ullage mixture to maintain the ullage mixture "lean," significantly below flammability limit of the fuel for the designed ignition energy threat. The fuel vapors are removed from the ullage mixture by the process of adsorption in an adsorbing media such as activated charcoal, and then the ullage mixture is returned to the fuel tank. This provides a closed-loop system that is simpler than some other embodiments, and it can be used for both vented fuel tanks and pressurized fuel tanks.

In one embodiment the system uses one adsorber which is periodically replaced as a line replacement unit (LRU), or fuel vapor can be removed from the adsorber during ground desorption. Alternatively, the adsorber can be recharged using an onboard adsorber recharging system. For example, the system can use two adsorbers or a twin adsorber unit and switch back and forth between them, to use one adsorber to adsorb fuel vapors from the ullage mixture, while the other adsorber is being desorbed or reactivated, and vice versa (FIGS. 13-14). This presents the advantage of simpler desorption system logic. In one embodiment the system uses a simple controller that is configured such that the ullage pump operates whenever electrical power is available. Alternatively, a system controller can determine ullage pump start and stop times using a built-in database or an algorithm stored in memory that relates flight parameters flammability conditions. The system can also measure ullage pressure and fuel temperature to determine when to start and stop the ullage pump in order to avoid potentially flammable conditions. The system and method is thus relatively simple and robust, has relatively low cost, low weight and low volume. It is also believed that this system will have significantly lower non-recurring and recurring costs.

Although various embodiments have been shown and described, the present disclosure is not so limited and will be understood to include all such modifications and variations are would be apparent to one skilled in the art.

What is claimed is:

1. A fuel vapor removal method for an aircraft, comprising:
removing an ullage mixture, having a fuel-air ratio, from ullage of a fuel tank of an aircraft;
exposing the ullage mixture to adsorption media of an adsorber on the aircraft, to produce a reduced fuel-air ratio ullage mixture; and
returning the reduced fuel-air ratio ullage mixture to the fuel tank.

2. The method of claim 1, wherein removing the ullage mixture comprises removing the ullage mixture from ullage of a pressurized fuel tank.

3. The method of claim 2, wherein removing the ullage mixture from ullage of a pressurized fuel tank and returning the reduced fuel-air ratio ullage mixture to the fuel tank comprises removing the ullage mixture from a vent tank associated with multiple fuel tanks of an aircraft, and returning the reduced fuel-air ratio ullage mixture to the multiple fuel tanks.

4. The method of claim 1, further comprising activating a pumping device, configured to pump the ullage mixture from the ullage, across the adsorption media, and back to the fuel tank, using a controller, including a microprocessor and system memory, programmed to activate the pumping device at a selected time.

5. The method of claim 4, wherein the controller is programmed to activate the pumping device whenever the controller has sufficient electrical power.

6. The method of claim 4, wherein the controller is coupled to an aircraft data system of the aircraft, and is programmed to determine fuel ullage conditions based on aircraft parameters received from the aircraft data system, and activate the pumping device based on the aircraft parameters.

7. The method of claim 4, wherein the controller is programmed with a flammability determination system, coupled to an ullage pressure sensor and a fuel temperature sensor, each associated with the fuel tank, the flammability determination system including programmed flammability limits for the fuel in the tank, and configured to activate the pumping device at temperature conditions that are lower than a flammability limit temperature of the fuel in the fuel tank.

8. The method of claim 1, wherein exposing the ullage mixture to the adsorption media and returning the reduced fuel-air ratio ullage mixture to the fuel tank occurs while the aircraft is in flight.

9. The method of claim 1, further comprising periodically removing the adsorber from the aircraft and replacing it with a recharged adsorber.

10. The method of claim 1, further comprising recharging the adsorber by exposing the adsorption media to a flow of air that is not laden with fuel vapors.

11. The method of claim 10, wherein recharging of the adsorber is performed with the adsorber installed on the aircraft.

12. The method of claim 10, wherein the adsorber comprises a pair of adsorber chambers, and recharging the adsorber is performed in-flight with a first adsorber chamber blocked from fluid communication with the fuel tank and exposed only to the flow of air, while a second adsorber chamber is in fluid communication with the fuel tank and exposed to the ullage mixture.

13. The method of claim 10, further comprising increasing a temperature of the flow of air relative to its ambient conditions, prior to or concurrent with exposure of the adsorption media to the air.

14. The method of claim 1, further comprising passing the ullage mixture through a prefilter prior to exposure to the adsorption media.

15. The method of claim 1 wherein the adsorption media comprises activated carbon.

16. A fuel vapor removal system onboard an aircraft, comprising:
a fuel tank having ullage containing an ullage mixture including fuel vapor and air;
a pumping device, configured to pump the ullage mixture in a pumping direction in a closed loop from the fuel tank ullage and back;
an adsorption system, interposed in the closed loop, including an adsorber having adsorption media capable of adsorbing fuel vapor from the ullage mixture; and
a controller, including a microprocessor and system memory, programmed to activate the pumping device, to pump the ullage mixture from the ullage, through the adsorption system, and return a reduced fuel-air ratio ullage mixture back to the ullage.

17. The system of claim 16, further comprising:
a fuel temperature sensor, configured to provide a fuel temperature signal to the controller;
a fuel tank pressure sensor, configured to provide a fuel tank pressure signal to the controller; and
a flammability determination system, including programmed flammability limits for the fuel in the tank, programmed into the controller, the flammability determination system comprising program code for activating the pumping device at temperature conditions lower than a flammability limit temperature of fuel in the fuel tank.

18. The system of claim 16, wherein the controller is programmed to activate the pumping device whenever the controller has sufficient electrical power.

19. The system of claim 16, further comprising an aircraft data system, coupled to the controller, configured to provide signals to the controller related to aircraft parameters, the controller being programmed to determine likely fuel tank conditions based at least in part on the aircraft parameters, and to activate the pumping device based at least on the likely fuel tank conditions.

20. The system of claim 16, wherein the fuel tank is pressurized.

21. The system of claim 20, wherein the ullage mixture is contained within a vent tank associated with multiple fuel tanks of the aircraft.

22. The system of claim 16, wherein the adsorber is removable from the aircraft, and is configured to be recharged outside of the aircraft.

23. The system of claim 16, further comprising a pair of connection ports, disposed upstream and downstream of the adsorber, configured to allow a desorption unit to be attached by ground maintenance personnel for recharging the adsorber while the unit is installed in the aircraft.

24. The system of claim 16, further comprising:
first and second chambers of the adsorber, each chamber containing adsorption media and being fluidly isolated from the other chamber, the adsorber being selectively switchable, whereby a selected one of the first and second chambers may be exclusively fluidly connected to the closed loop at a given time; and
an air conduit, in fluid communication with the one of the first and second chambers that is not connected to the closed loop at any given time, whereby recharge air can flow through the one of the first and second chambers that is not connected to the closed loop, while the selected one of the first and second chambers is positioned for exposure to the ullage mixture in the closed loop.

25. The system of claim 16, further comprising a prefilter, disposed upstream of the adsorber.

26. The system of claim 16, wherein the adsorption media comprises activated carbon.

* * * * *